US012709143B2

(12) United States Patent
Wolf et al.

(10) Patent No.: US 12,709,143 B2
(45) Date of Patent: Aug. 18, 2026

(54) UNIBODY REFUSE VEHICLE

(71) Applicant: Oshkosh Corporation, Oshkosh, WI (US)

(72) Inventors: Ryan Wolf, Oshkosh, WI (US); Greg Steffens, Oshkosh, WI (US); Jeff Verhagen, Oshkosh, WI (US); Victor Rysdam, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 500 days.

(21) Appl. No.: 18/342,550

(22) Filed: Jun. 27, 2023

(65) Prior Publication Data

US 2023/0415556 A1 Dec. 28, 2023

Related U.S. Application Data

(60) Provisional application No. 63/356,140, filed on Jun. 28, 2022.

(51) Int. Cl.

*B60K 1/04* (2019.01)
*B60L 50/60* (2019.01)
*B62D 24/02* (2006.01)
*B65F 3/02* (2006.01)

(52) U.S. Cl.

CPC ................ *B60K 1/04* (2013.01); *B60L 50/66* (2019.02); *B62D 24/02* (2013.01); *B65F 3/02* (2013.01); *B60K 2001/0438* (2013.01); *B65F 2003/0269* (2013.01); *B65F 2003/0279* (2013.01)

(58) Field of Classification Search

CPC .............. B60K 1/04; B60K 2001/0444; B60K 2001/0438; B60L 50/66; B62D 24/02; B65F 3/02

See application file for complete search history.

(56) References Cited

U.S. PATENT DOCUMENTS

| | | | | |
|---|---|---|---|---|
| 10,245,972 | B2 * | 4/2019 | Healy | B60L 8/003 |
| 10,493,837 | B1 * | 12/2019 | Angelo | B60K 6/28 |
| 10,589,788 | B1 * | 3/2020 | Milton | B62D 21/02 |
| 10,596,913 | B2 * | 3/2020 | Healy | B60L 15/2018 |
| 10,752,102 | B2 * | 8/2020 | Lampsa | B60L 58/21 |
| 10,821,853 | B2 * | 11/2020 | Healy | B60L 58/13 |
| 11,043,707 | B2 * | 6/2021 | Sloan | H01M 10/625 |
| 11,043,714 | B2 * | 6/2021 | Sloan | B60K 1/04 |
| 11,046,192 | B2 * | 6/2021 | Aufdencamp | B60L 50/60 |
| 11,845,346 | B2 * | 12/2023 | Castleman | B62D 24/00 |
| 11,926,207 | B2 * | 3/2024 | McKibben | B60L 58/21 |
| 11,932,098 | B2 * | 3/2024 | Hendriks | B60L 50/66 |

(Continued)

*Primary Examiner* — Jeffrey J Restifo

(74) *Attorney, Agent, or Firm* — Foley & Lardner LLP

(57) ABSTRACT

A refuse vehicle includes a frame structure, one or more axle assemblies, a body, one or more cab supports, a plurality of brackets, and a battery frame. The one or more axle assemblies are coupled to the frame structure and extend laterally from the frame structure. The body is coupled to the frame structure and extends along at least a portion of a length of the frame structure. The body includes an upper section, a middle section, and a lower section. The one or more cab supports extend along the length of the frame structure and are configured to receive a cab of the refuse vehicle. The plurality of brackets are fixedly coupled to the frame structure and the body. The body and the battery frame cooperatively define a unitary body.

20 Claims, 21 Drawing Sheets

(56) References Cited

U.S. PATENT DOCUMENTS 12,024,029 B2 * 7/2024 Healy .................... B60L 8/003
12,162,363 B2 * 12/2024 Javidan .................. B60L 50/66
12,208,669 B2 * 1/2025 Landvik ................. B62D 21/04
12,269,333 B2 * 4/2025 Kemmet ................ B62D 21/20
12,337,671 B2 * 6/2025 Ragot .................... B60L 50/64
12,409,718 B2 * 9/2025 Wheeler ................. B60K 1/04
12,415,416 B2 * 9/2025 Wallin .................. B60K 17/28
12,459,512 B2 * 11/2025 Wolf ............... B60W 30/18127
12,497,109 B2 * 12/2025 Zeamer ................. B62D 33/06
12,502,942 B1 * 12/2025 Murphy .................. B60K 1/04
12,508,925 B2 * 12/2025 Hörder ................... B60L 50/66
12,515,507 B2 * 1/2026 Zhang ..................... B60K 1/04
12,522,063 B2 * 1/2026 Kümmel .................. B60K 1/04
12,533,937 B2 * 1/2026 Murphy .................. B60K 1/04
12,552,289 B2 * 2/2026 Miller .................... B60L 58/24
12,565,409 B2 * 3/2026 Leon ....................... B60K 1/04
2019/0077254 A1 * 3/2019 Stanley, II .............. B60K 6/28
2019/0276102 A1 9/2019 Zuleger et al.
2020/0290237 A1 9/2020 Steffens et al.
2020/0291846 A1 9/2020 Steffens et al.
2021/0171137 A1 6/2021 Zuleger et al.
2021/0276643 A1 9/2021 Ellifson et al.
2022/0072736 A1 3/2022 Steffens et al.
2022/0118854 A1 4/2022 Davis et al.
2023/0070279 A1 3/2023 Wheeler et al.
2023/0070769 A1 3/2023 Wheeler et al.
2023/0074504 A1 3/2023 Ellifson et al.
2023/0150584 A1 5/2023 Zeamer et al.
2023/0150763 A1 5/2023 Haberlein et al.
2023/0191887 A1 6/2023 Rausch et al.
2023/0192401 A1 6/2023 Zeamer et al.
2023/0211705 A1 7/2023 Zeamer et al.
2023/0264601 A1 8/2023 Haberlein et al.
2023/0278425 A1 9/2023 Miller et al.
2023/0278475 A1 * 9/2023 Steffens ................ B60K 35/65
180/334
2023/0311768 A1 * 10/2023 Chan ..................... G06V 20/56
348/148
2023/0312236 A1 * 10/2023 Miller ....................... B65F 3/02
414/406
2023/0373376 A1 * 11/2023 Saroka ................. F25D 11/003
2023/0415556 A1 * 12/2023 Wolf ........................ B60K 1/04
2023/0415641 A1 * 12/2023 Miller ............... G01R 31/3646
2023/0415982 A1 * 12/2023 Miller ....................... B60P 1/50
2024/0010079 A1 * 1/2024 Kümmel ................ B60L 50/66
2024/0149666 A1 * 5/2024 Nieuwland .............. B66F 9/07
2024/0166040 A1 * 5/2024 Coupal-Sikes ..... H01M 50/204
2024/0278685 A1 * 8/2024 Miller ....................... B65F 3/06
2024/0278858 A1 * 8/2024 Hargas .................. B62D 33/06
2024/0284645 A1 * 8/2024 Goodman .............. B60L 1/003
2024/0308321 A1 * 9/2024 Ragot ...................... B60K 1/04
2025/0153555 A1 * 5/2025 Little ...................... B60L 50/66
2025/0162406 A1 * 5/2025 Landvik ................ B60K 15/07
2025/0219429 A1 * 7/2025 Verhagen ............... B60L 1/003
2025/0256558 A1 * 8/2025 Cao .......................... B60K 1/04
2025/0262924 A1 * 8/2025 Landvik .................. B60K 1/04
2025/0276572 A1 * 9/2025 Jones ....................... B60K 1/04
2025/0289301 A1 * 9/2025 Green ................ H01M 50/249
2025/0289336 A1 * 9/2025 Rees ...................... B60L 58/22
2025/0316819 A1 * 10/2025 Landvik ............. H01M 50/249
2025/0316821 A1 * 10/2025 Landvik ............. H01M 50/258
2025/0340134 A1 * 11/2025 Weykamp .............. B60L 50/72
2025/0340244 A1 * 11/2025 Murphy .............. B62D 21/155
2025/0343286 A1 * 11/2025 Verhagen ........... H01M 10/425
2025/0360812 A1 * 11/2025 Lundin .................. B60L 50/66
2025/0364665 A1 * 11/2025 Landvik .................. B60K 1/04
2025/0381830 A1 * 12/2025 Landvik .................. B60K 1/04
2026/0014845 A1 * 1/2026 Sharifian ................. B60K 1/04

* cited by examiner

UNIBODY REFUSE VEHICLE

CROSS-REFERENCE TO RELATED PATENT APPLICATIONS

This application claims the benefit of and priority to U.S. Provisional Patent Application No. 63/356,140 filed on Jun. 28, 2022, the entire disclosure of which is incorporated by reference herein.

BACKGROUND

The present disclosure relates generally to vehicles. More specifically, the present disclosure relates to a vehicle including a unitary body formed between a body, a frame structure, and a battery frame.

SUMMARY

One embodiment relates to a refuse vehicle. The refuse vehicle includes a frame structure, one or more axle assemblies, a body, one or more cab supports, a plurality of brackets, and a battery frame. The one or more axle assemblies are coupled to the frame structure and extend laterally from the frame structure. The body is coupled to the frame structure and extends along at least a portion of a length of the frame structure. The body includes an upper section, a middle section, and a lower section. The one or more cab supports extend along the length of the frame structure and are configured to receive a cab of the refuse vehicle. The plurality of brackets are fixedly coupled to the frame structure and the body. The plurality of brackets are configured to secure the frame structure to the body. The battery frame is coupled to the frame structure. The battery frame configured to house one or more battery modules therein. The body and the battery frame cooperatively define a unitary body.

In some embodiments, the battery frame extends between a cavity formed between the one or more axle assemblies.

In some embodiments, the one or more axle assemblies can include a plurality of axle assemblies. The battery frame can be disposed at least partially between a first axle assembly of the plurality of axle assemblies and a second axle assembly of the plurality of axle assemblies, and the first axle assembly of the plurality of axle assemblies can be located proximate to a first side of the frame structure and the second axle assembly of the plurality of axle assemblies can be located proximate to a second side of the frame structure.

In some embodiments, the first axle assembly of the plurality of axle assemblies can be coupled with the second axle assembly of the plurality of axle assemblies via a second frame structure disposed at least partially beneath the first axle assembly of the plurality of axle assemblies and the second axle assembly of the plurality of axle assemblies, and the second frame structure can establish a first section to house the battery frame.

In some embodiments, the battery frame can carry at least a portion of the refuse vehicle, and the battery frame can be removably coupled with the frame structure such that the one or more battery modules are selectively removable from the battery frame.

In some embodiments, the battery frame can have a first offset from the body substantially similar to a second offset of the one or axle assemblies from the body, and the first offset of the battery frame can define a space between the battery frame and the body.

In some embodiments, the frame structure can include a cavity configured to house the one or more battery modules such that the one or more battery modules are disposed at least partially between a first portion of the frame structure and a first portion of the battery frame.

In some embodiments, the battery frame can extend outward from a least a portion of the body, and the battery frame configured to define at least one side of the unitary body.

In some embodiments, the one or more axle assemblies can include a first axle assembly and a second axle assembly, and the refuse vehicle can include a suspension system. The suspension system can include the first axle assembly and the second axle assembly. The suspension system can also include a second frame structure coupled to the first axle assembly and the second axle assembly, the second frame structure extending along a bottom portion of the suspension system, and the first axle assembly, the second axle assembly, and the second frame structure can cooperatively define a center section of the refuse vehicle, and the one or more battery modules positioned within the center section.

In some embodiments, the one or more battery modules can be electrically coupled with at least one motor and the one or more battery modules can provide power to the motor to move the refuse vehicle.

In some embodiments, the one or more battery modules can be electrically coupled with the one or more axle assemblies, and the one or more axle assemblies configured to provide power, responsive to a movement of the one or more axle assemblies, to the one or more battery modules.

At least one embodiment relates to a refuse vehicle. The refuse vehicle can include a frame structure. The refuse vehicle can also include a plurality of axle assemblies coupled to the frame structure and extending laterally from the frame structure. A first axle assembly of the plurality of axle assemblies can be located proximate to a first side of the frame structure, and a second axle assembly of the plurality of axle assemblies can be located proximate to a second side of the frame structure. The refuse vehicle can also include a body coupled to the frame structure and extending along at least a portion of a length of the frame structure, the body comprising an upper section, a middle section, and a lower section. The refuse vehicle can also include a plurality of brackets fixedly coupled to the frame structure and the body, the plurality of brackets configured to secure the frame structure to the body. The refuse vehicle can also include a battery frame coupled to the frame structure, the battery frame configured to house one or more battery modules therein, and the battery frame disposed at least partially between the first axle assembly of the plurality of axle assemblies and the second axle assembly of the plurality of axle assemblies, and the body and the battery frame can cooperatively define a unitary body.

In some embodiments, the battery frame can extend between a cavity formed between the first axle assembly of the plurality of axle assemblies and the second axle assembly of the plurality of axle assemblies.

In some embodiments, the first axle assembly of the plurality of axle assemblies can be coupled with the second axle assembly of the plurality of axle assemblies via a second frame structure disposed at least partially beneath the first axle assembly of the plurality of axle assemblies and the second axle assembly of the plurality of axle assemblies, and the second frame structure can establish a first section to house the battery frame.

In some embodiments, the battery frame can carry at least a portion of the refuse vehicle, and the battery frame can be removably coupled with the frame structure such that the one or more battery modules are selectively removable from the battery frame.

In some embodiments, the battery frame can have a first offset from the body substantially similar to a second offset of at least one of the first axle assembly of the plurality of axle assemblies or the second axle assembly of the plurality of axle assemblies, and the first offset of the battery frame can define a space between the battery frame and the body.

In some embodiments, the frame structure can include a cavity configured to house the one or more battery modules such that the one or more battery modules are disposed at least partially between a first portion of the frame structure and a first portion of the battery frame.

In some embodiments, the battery frame can extend outward from a least a portion of the body, and the battery frame can define at least one side of the unitary body.

At least one embodiment relates to a refuse vehicle. The refuse vehicle can include a frame structure. The refuse vehicle can also include a suspension system. The suspension system can include a first axle assembly positioned on a first side of the suspension system. The suspension system can also include a second axle assembly positioned on a second side of the suspension system. The suspension system can also include a second frame structure coupled to the first axle assembly and the second axle assembly, the second frame extending along a bottom portion of the suspension system, and the first axle assembly, the second axle assembly, and the second frame structure can cooperatively define a center section. The refuse vehicle can also include a body coupled to the frame structure. The refuse vehicle can also include a battery frame coupled to the frame structure, the battery frame configured to house one or more battery modules therein, and at least a portion of the battery frame disposed within the center section, and the body and the battery frame configured to cooperatively define a unitary body.

In some embodiments, the one or more battery modules can be electrically coupled with at least one motor and the one or more battery modules can provide power to the motor to move the refuse vehicle.

Still another embodiment relates to suspension system. The suspension system includes a first axle assembly, a second axle assembly, and a frame coupled to the first axle assembly and the second axle assembly. The first axle assembly is positioned on a first side of the suspension system. The second axle assembly is positioned on a second side of the suspension system. The frame extends along a bottom portion of the suspension system. The first axle assembly, the second axle assembly, and the frame cooperatively define a center section. A battery module is positioned within the center section.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a vehicle includes a frame structure, one or more axle assemblies, a body, one or more cab supports, a plurality of brackets, and a battery frame. The one or more axle assemblies are coupled to the frame structure and extend laterally from the frame structure. The body is coupled to the frame structure and extends along at least a portion of a length of the frame structure. The body includes an upper section, a middle section, and a lower section. The one or more cab supports extend along the length of the frame structure and are configured to receive a cab of the refuse vehicle. The plurality of brackets are fixedly coupled to the frame structure and the body. The plurality of brackets are configured to house one or more battery modules therein. The body and the battery frame cooperatively define a unitary body.

In some embodiments, the battery frame extends between a cavity formed between the one or more axle assemblies.

The vehicle further includes a suspension system. The suspension system includes a first axle assembly, a second axle assembly, and a frame coupled to the first axle assembly and the second axle assembly. The first axle assembly is positioned on a first side of the suspension system. The second axle assembly is positioned on a second side of the suspension system. The frame extends along a bottom portion of the suspension system. The first axle assembly, the second axle assembly, and the frame cooperatively define a center section. A battery module is positioned within the center section.

Overall Vehicle

Figure 1:
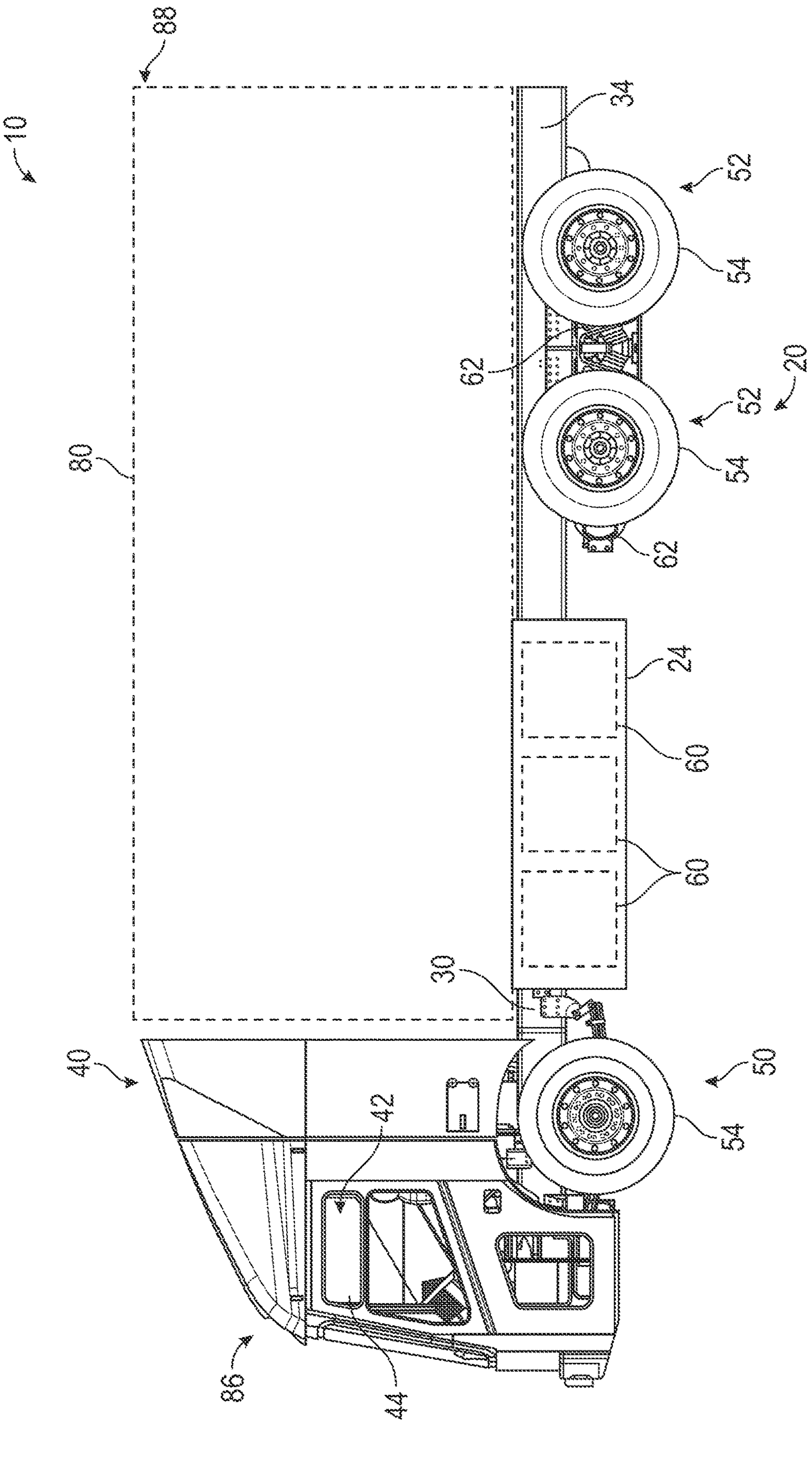
FIG. 1 is a left side view of a vehicle, according to an exemplary embodiment.
Figure 2:
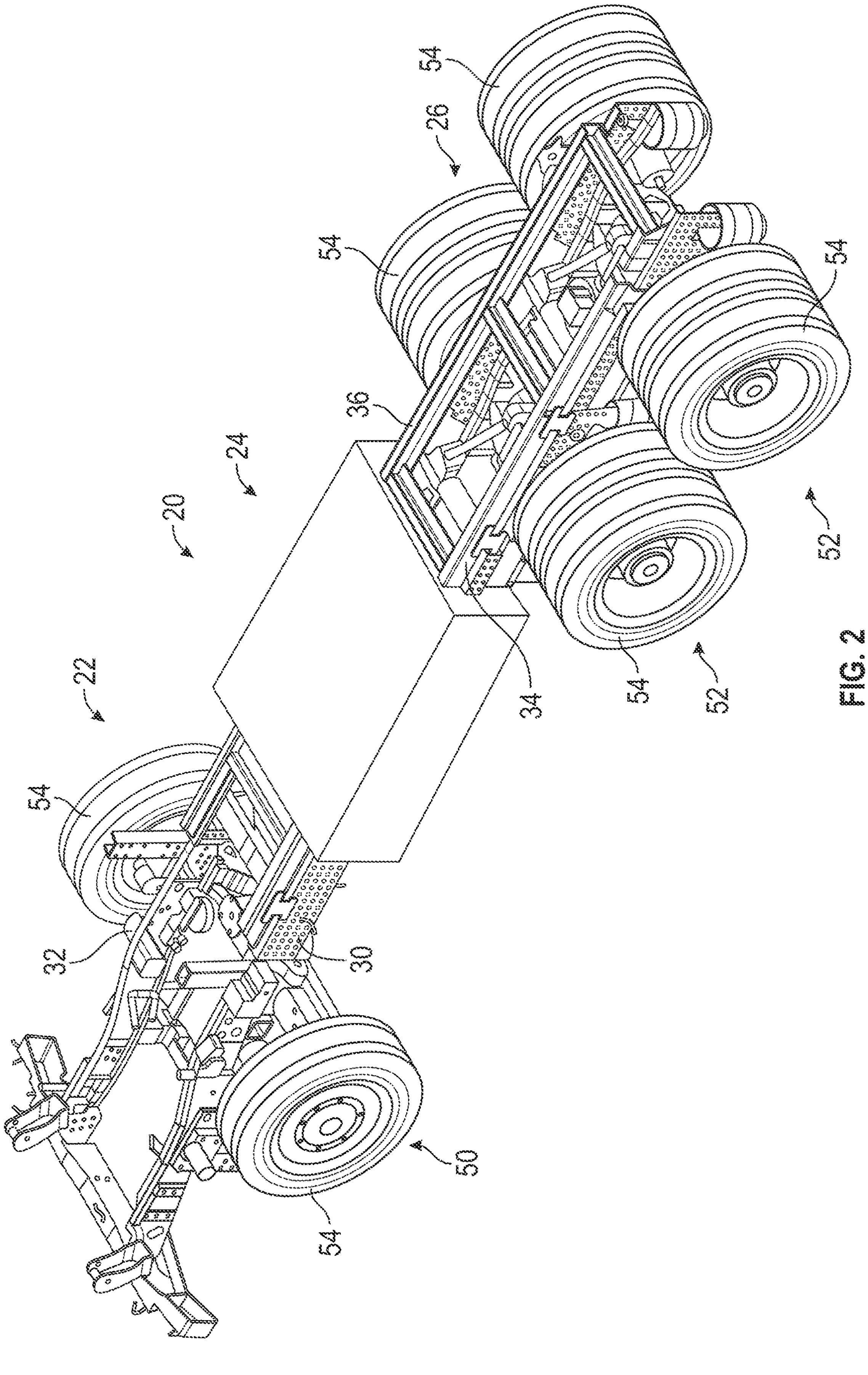
FIG. 2 is a perspective view of a chassis of the vehicle of FIG. 1.

Referring to FIGS. 1 and 2, a reconfigurable vehicle (e.g., a vehicle assembly, a truck, a vehicle base, etc.) is shown as vehicle 10, according to an exemplary embodiment. As shown, the vehicle 10 includes a frame assembly or chassis assembly, shown as chassis 20, that supports other components of the vehicle 10. The chassis 20 extends longitudinally along a length of the vehicle 10, substantially parallel to a primary direction of travel of the vehicle 10. As shown, the chassis 20 includes three sections or portions, shown as front section 22, middle section 24, and rear section 26. The middle section 24 of the chassis 20 extends between the front section 22 and the rear section 26. In some embodiments, the middle section 24 of the chassis 20 couples the front section 22 to the rear section 26. In other embodiments, the front section 22 is coupled to the rear section 26 by another component (e.g., the body of the vehicle 10).

As shown in FIG. 2, the front section 22 includes a pair of frame portions, frame members, or frame rails, shown as front rail portion 30 and front rail portion 32. The rear section 26 includes a pair of frame portions, frame members, or frame rails, shown as rear rail portion 34 and rear rail portion 36. The front rail portion 30 is laterally offset from the front rail portion 32. Similarly, the rear rail portion 34 is laterally offset from the rear rail portion 36. This spacing may provide frame stiffness and space for vehicle components (e.g., batteries, motors, axles, gears, etc.) between the frame rails. In some embodiments, the front rail portions 30 and 32 and the rear rail portions 34 and 36 extend longitudinally and substantially parallel to one another. The chassis 20 may include additional structural elements (e.g., cross members that extend between and couple the frame rails).

In some embodiments, the front section 22 and the rear section 26 are configured as separate, discrete subframes (e.g., a front subframe and a rear subframe). In such embodiments, the front rail portion 30, the front rail portion 32, the rear rail portion 34, and the rear rail portion 36 are separate, discrete frame rails that are spaced apart from one another. In some embodiments, the front section 22 and the rear section 26 are each directly coupled to the middle section 24 such that the middle section 24 couples the front section 22 to the rear section 26. Accordingly, the middle section 24 may include a structural housing or frame. In other embodiments, the front section 22, the middle section 24, and the rear section 26 are coupled to one another by another component, such as a body of the vehicle 10.

In other embodiments, the front section 22, the middle section 24, and the rear section 26 are defined by a pair of frame rails that extend continuously along the entire length of the vehicle 10. In such an embodiment, the front rail portion 30 and the rear rail portion 34 would be front and rear portions of a first frame rail, and the front rail portion 32 and the rear rail portion 36 would be front and rear portions of a second frame rail. In such embodiments, the middle section 24 would include a center portion of each frame rail.

In some embodiments, the middle section 24 acts as a storage portion that includes one or more vehicle components. The middle section 24 may include an enclosure that contains one or more vehicle components and/or a frame that supports one or more vehicle components. By way of example, the middle section 24 may contain or include one or more electrical energy storage devices (e.g., batteries, capacitors, etc.). By way of another example, the middle section 24 may include fuel tanks fuel tanks. By way of yet another example, the middle section 24 may define a void space or storage volume that can be filled by a user.

A cabin, operator compartment, or body component, shown as cab 40, is coupled to a front end portion of the chassis 20 (e.g., the front section 22 of the chassis 20). Together, the chassis 20 and the cab 40 define a front end of the vehicle 10. The cab 40 extends above the chassis 20. The cab 40 includes an enclosure or main body that defines an interior volume, shown as cab interior 42, that is sized to contain one or more operators. The cab 40 also includes one or more doors 44 that facilitate selective access to the cab interior 42 from outside of the vehicle 10. The cab interior 42 contains one or more components that facilitate operation of the vehicle 10 by the operator. By way of example, the cab interior 42 may contain components that facilitate operator comfort (e.g., seats, seatbelts, etc.), user interface components that receive inputs from the operators (e.g., steering wheels, pedals, touch screens, switches, buttons, levers, etc.), and/or user interface components that provide information to the operators (e.g., lights, gauges, speakers, etc.). The user interface components within the cab 40 may facilitate operator control over the drive components of the vehicle 10 and/or over any implements of the vehicle 10.

The vehicle 10 further includes a series of axle assemblies, shown as front axle 50 and rear axles 52. As shown, the vehicle 10 includes one front axle 50 coupled to the front section 22 of the chassis 20 and two rear axles 52 each coupled to the rear section 26 of the chassis 20. In other embodiments, the vehicle 10 includes more or fewer axles. By way of example, the vehicle 10 may include a tag axle that may be raised or lowered to accommodate variations in weight being carried by the vehicle 10. The front axle 50 and the rear axles 52 each include a series of tractive elements (e.g., wheels, treads, etc.), shown as wheel and tire assemblies 54. The wheel and tire assemblies 54 are configured to engage a support surface (e.g., roads, the ground, etc.) to support and propel the vehicle 10. The front axle 50 and the rear axles may include steering components (e.g., steering arms, steering actuators, etc.), suspension components (e.g., gas springs, dampeners, air springs, etc.), power transmission or drive components (e.g., differentials, drive shafts, etc.), braking components (e.g., brake actuators, brake pads, brake discs, brake drums, etc.), and/or other components that facilitate propulsion or support of the vehicle.

In some embodiments, the vehicle 10 is configured as an electric vehicle that is propelled by an electric powertrain system. Referring to FIG. 1, the vehicle 10 includes one or more electrical energy storage devices (e.g., batteries, capacitors, etc.), shown as batteries 60. As shown, the batteries 60 are positioned within the middle section 24 of the chassis 20. In other embodiments, the batteries 60 are otherwise positioned throughout the vehicle 10. The vehicle 10 further includes one or more electromagnetic devices or prime movers (e.g., motor/generators), shown as drive motors 62. The drive motors 62 are electrically coupled to the batteries 60. The drive motors 62 may be configured to receive electrical energy from the batteries 60 and provide rotational mechanical energy to the wheel and tire assemblies 54 to propel the vehicle 10. The drive motors 62 may be configured to receive rotational mechanical energy from the wheel and tire assemblies 64 and provide electrical energy to the batteries 60, providing a braking force to slow the vehicle 10.

The batteries 60 may include one or more rechargeable batteries (e.g., lithium-ion batteries, nickel-metal hydride batteries, lithium-ion polymer batteries, lead-acid batteries, nickel-cadmium batteries, etc.). The batteries 60 may be charged by one or more sources of electrical energy onboard the vehicle 10 (e.g., solar panels, etc.) or separate from the vehicle 10 (e.g., connections to an electrical power grid, a wireless charging system, etc.). As shown, the drive motors 62 are positioned within the rear axles 52 (e.g., as part of a combined axle and motor assembly). In other embodiments, the drive motors 62 are otherwise positioned within the vehicle 10.

In other embodiments, the vehicle 10 is configured as a hybrid vehicle that is propelled by a hybrid powertrain system (e.g., a diesel/electric hybrid, gasoline/electric hybrid, natural gas/electric hybrid, etc.). According to an exemplary embodiment, the hybrid powertrain system may include a primary driver (e.g., an engine, a motor, etc.), an energy generation device (e.g., a generator, etc.), and/or an energy storage device (e.g., a battery, capacitors, ultra-capacitors, etc.) electrically coupled to the energy generation device. The primary driver may combust fuel (e.g., gasoline, diesel, etc.) to provide mechanical energy, which a transmission may receive and provide to the axle front axle 50 and/or the rear axles 52 to propel the vehicle 10. Additionally or alternatively, the primary driver may provide mechanical energy to the generator, which converts the mechanical energy into electrical energy. The electrical energy may be stored in the energy storage device (e.g., the batteries 60) in order to later be provided to a motive driver.

In yet other embodiments, the chassis 20 may further be configured to support non-hybrid powertrains. For example, the powertrain system may include a primary driver that is a compression-ignition internal combustion engine that utilizes diesel fuel.

Referring to FIG. 1, the vehicle 10 includes a rear assembly, module, implement, body, or cargo area, shown as application kit 80. The application kit 80 may include one or more implements, vehicle bodies, and/or other components. Although the application kit 80 is shown positioned behind the cab 40, in other embodiments the application kit 80 extends forward of the cab 40. The vehicle 10 may be outfitted with a variety of different application kits 80 to configure the vehicle 10 for use in different applications. Accordingly, a common vehicle 10 can be configured for a variety of different uses simply by selecting an appropriate application kit 80. By way of example, the vehicle 10 may be configured as a refuse vehicle, a concrete mixer, a fire fighting vehicle, an airport fire fighting vehicle, a lift device (e.g., a boom lift, a scissor lift, a telehandler, a vertical lift, etc.), a crane, a tow truck, a military vehicle, a delivery vehicle, a mail vehicle, a boom truck, a plow truck, a farming machine or vehicle, a construction machine or vehicle, a coach bus, a school bus, a semi-truck, a passenger or work vehicle (e.g., a sedan, a SUV, a truck, a van, etc.), and/or still another vehicle. FIGS. 3-13 illustrate various examples of how the vehicle 10 may be configured for specific applications. Although only a certain set of vehicle configurations is shown, it should be understood that the vehicle 10 may be configured for use in other applications that are not shown.

The application kit 80 may include various actuators to facilitate certain functions of the vehicle 10. By way of example, the application kit 80 may include hydraulic actuators (e.g., hydraulic cylinders, hydraulic motors, etc.), pneumatic actuators (e.g., pneumatic cylinders, pneumatic motors, etc.), and/or electrical actuators (e.g., electric motors, electric linear actuators, etc.). The application kit 80 may include components that facilitate operation of and/or control of these actuators. By way of example, the application kit 80 may include hydraulic or pneumatic components that form a hydraulic or pneumatic circuit (e.g., conduits, valves, pumps, compressors, gauges, reservoirs, accumulators, etc.). By way of another example, the application kit 80 may include electrical components (e.g., batteries, capacitors, voltage regulators, motor controllers, etc.). The actuators may be powered by components of the vehicle 10. By way of example, the actuators may be powered by the batteries 60, the drive motors 62, or the primary driver (e.g., through a power take off).

The vehicle 10 generally extends longitudinally from a front side 86 to a rear side 88. The front side 86 is defined by the cab 40 and/or the chassis. The rear side 88 is defined by the application kit 80 and/or the chassis 20. The primary, forward direction of travel of the vehicle 10 is longitudinal, with the front side 86 being arranged forward of the rear side 88.

A. Front-Loading Refuse Vehicle

Figure 3:
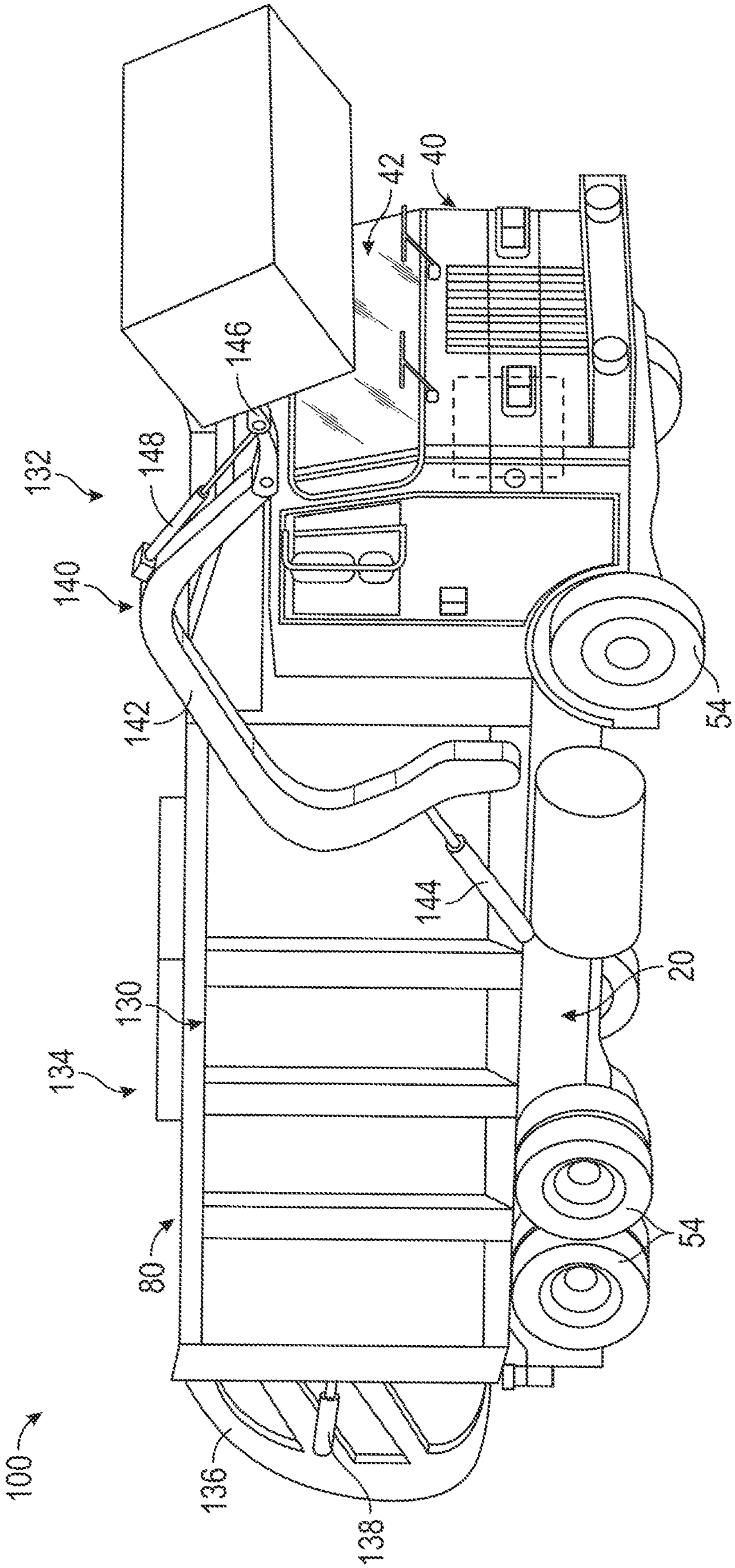
FIG. 3 is a perspective view of the vehicle of FIG. 1 configured as a front-loading refuse vehicle, according to an exemplary embodiment.
Figure 4:
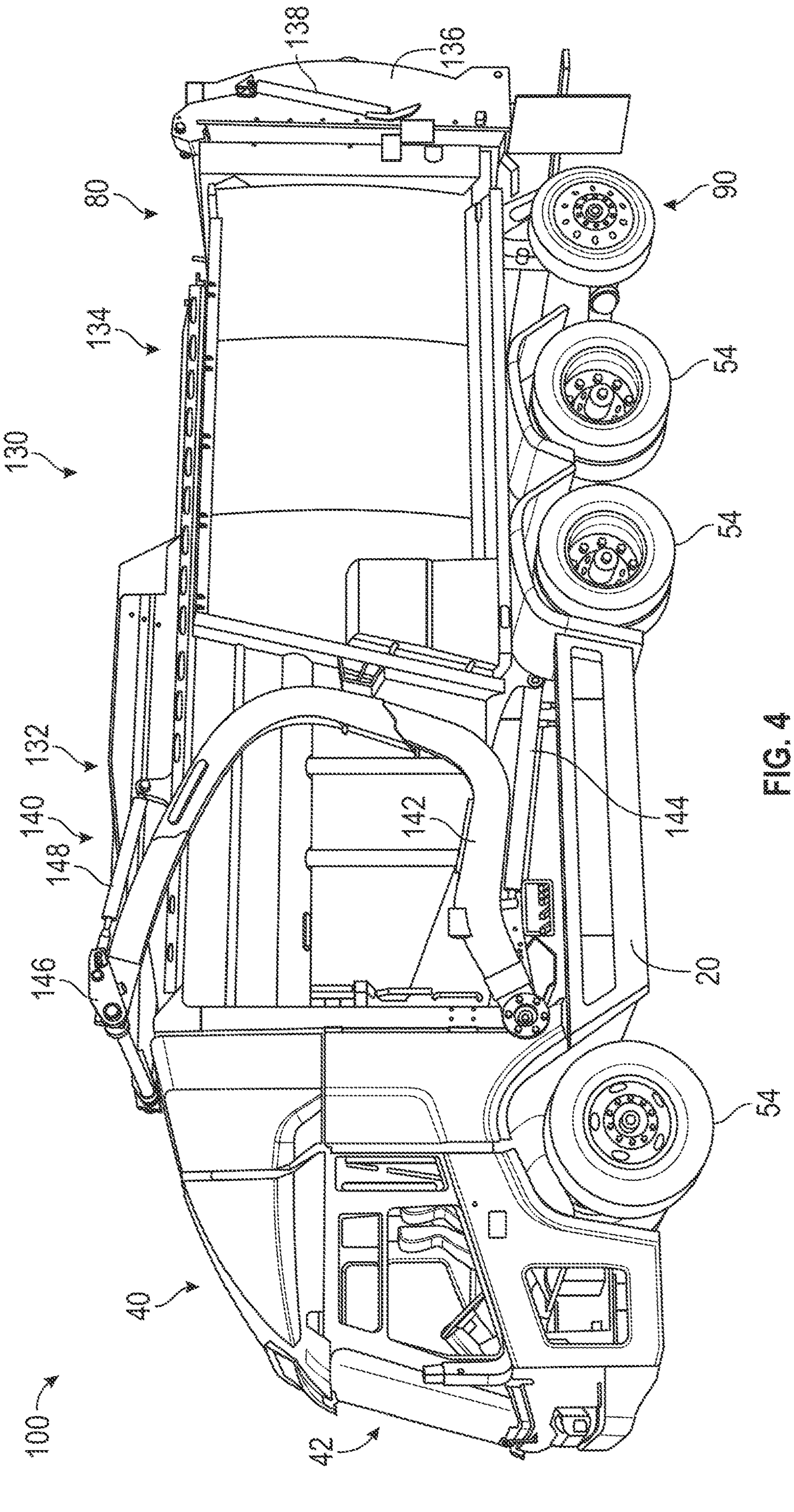
FIG. 4 is a left side view of the front-loading refuse vehicle of FIG. 3 configured with a tag axle.

Referring now to FIGS. 3 and 4, the vehicle 10 is configured as a refuse vehicle 100 (e.g., a refuse truck, a garbage truck, a waste collection truck, a sanitation truck, a recycling truck, etc.). Specifically, the refuse vehicle 100 is a front-loading refuse vehicle. In other embodiments, the refuse vehicle 100 is configured as a rear-loading refuse vehicle or a front-loading refuse vehicle. The refuse vehicle 100 may be configured to transport refuse from various waste receptacles (e.g., refuse containers) within a municipality to a storage and/or processing facility (e.g., a landfill, an incineration facility, a recycling facility, etc.).

FIG. 4 illustrates the refuse vehicle 100 of FIG. 3 configured with a liftable axle, shown as tag axle 90, including a pair of wheel and tire assemblies 54. As shown, the tag axle 90 is positioned reward of the rear axles 52. The tag axle 90 can be selectively raised and lowered (e.g., by a hydraulic actuator) to selectively engage the wheel and tire assemblies 54 of the tag axle 90 with the ground. The tag axle 90 may be raised to reduce rolling resistance experienced by the refuse vehicle 100. The tag axle 90 may be lowered to distribute the loaded weight of the vehicle 100 across a greater number of a wheel and tire assemblies 54 (e.g., when the refuse vehicle 100 is loaded with refuse).

As shown in FIGS. 3 and 4, the application kit 80 of the refuse vehicle 100 includes a series of panels that form a rear body or container, shown as refuse compartment 130. The refuse compartment 130 may facilitate transporting refuse from various waste receptacles within a municipality to a storage and/or a processing facility (e.g., a landfill, an incineration facility, a recycling facility, etc.). By way of example, loose refuse may be placed into the refuse compartment 130 where it may be compacted (e.g., by a packer system within the refuse compartment 130). The refuse compartment 130 may also provide temporary storage for refuse during transport to a waste disposal site and/or a recycling facility. In some embodiments, the refuse compartment 130 may define a hopper volume 132 and storage volume 134. In this regard, refuse may be initially loaded into the hopper volume 132 and later compacted into the storage volume 134. As shown, the hopper volume 132 is positioned between the storage volume 134 and the cab 40 (e.g., refuse is loaded into a portion of the refuse compartment 130 behind the cab 40 and stored in a portion further toward the rear of the refuse compartment 130). In other embodiments, the storage volume may be positioned between the hopper volume and the cab 40 (e.g., in a rear-loading refuse truck, etc.). The application kit 80 of the refuse vehicle 100 further includes a pivotable rear portion, shown as tailgate 136, that is pivotally coupled to the refuse compartment 130. The tailgate 136 may be selectively repositionable between a closed position and an open position by an actuator (e.g., a hydraulic cylinder, an electric linear actuator, etc.), shown as tailgate actuator 138 (e.g., to facilitate emptying the storage volume).

As shown in FIGS. 3 and 4, the refuse vehicle 100 also includes an implement, shown as lift assembly 140, which is a front-loading lift assembly. According to an exemplary embodiment, the lift assembly 140 includes a pair of lift arms 142 and a pair of actuators (e.g., hydraulic cylinders, electric linear actuators, etc.), shown as lift arm actuators 144. The lift arms 142 may be rotatably coupled to the chassis 20 and/or the refuse compartment 130 on each side of the refuse vehicle 100 (e.g., through a pivot, a lug, a shaft, etc.), such that the lift assembly 140 may extend forward relative to the cab 40 (e.g., a front-loading refuse truck, etc.). In other embodiments, the lift assembly 140 may extend rearward relative to the application kit 80 (e.g., a rear-loading refuse truck). As shown in FIGS. 3 and 4, in an exemplary embodiment the lift arm actuators 144 may be positioned such that extension and retraction of the lift arm actuators 144 rotates the lift arms 142 about an axis extending through the pivot. In this regard, the lift arms 142 may be rotated by the lift arm actuators 144 to lift a refuse container over the cab 40. The lift assembly 140 further includes a pair of interface members, shown as lift forks 146, each pivotally coupled to a distal end of one of the lift arms 142. The lift forks 146 may be configured to engage a refuse container (e.g., a dumpster) to selectively coupled the refuse container to the lift arms 142. By way of example, each of the lift forks 146 may be received within a corresponding pocket defined by the refuse container. A pair of actuators (e.g., hydraulic cylinders, electric linear actuators, etc.), shown as articulation actuators 148, are each coupled to one of the lift arms 142 and one of the lift forks 146. The articulation actuators 148 may be positioned to rotate the lift forks 146 relative to the lift arms 142 about a horizontal axis. Accordingly, the articulation actuators 148 may assist in tipping refuse out of the refuse container and into the refuse compartment 130. The lift arm actuators 144 may then rotate the lift arms 142 to return the empty refuse container to the ground.

B. Side-Loading Refuse Vehicle

Figure 5:
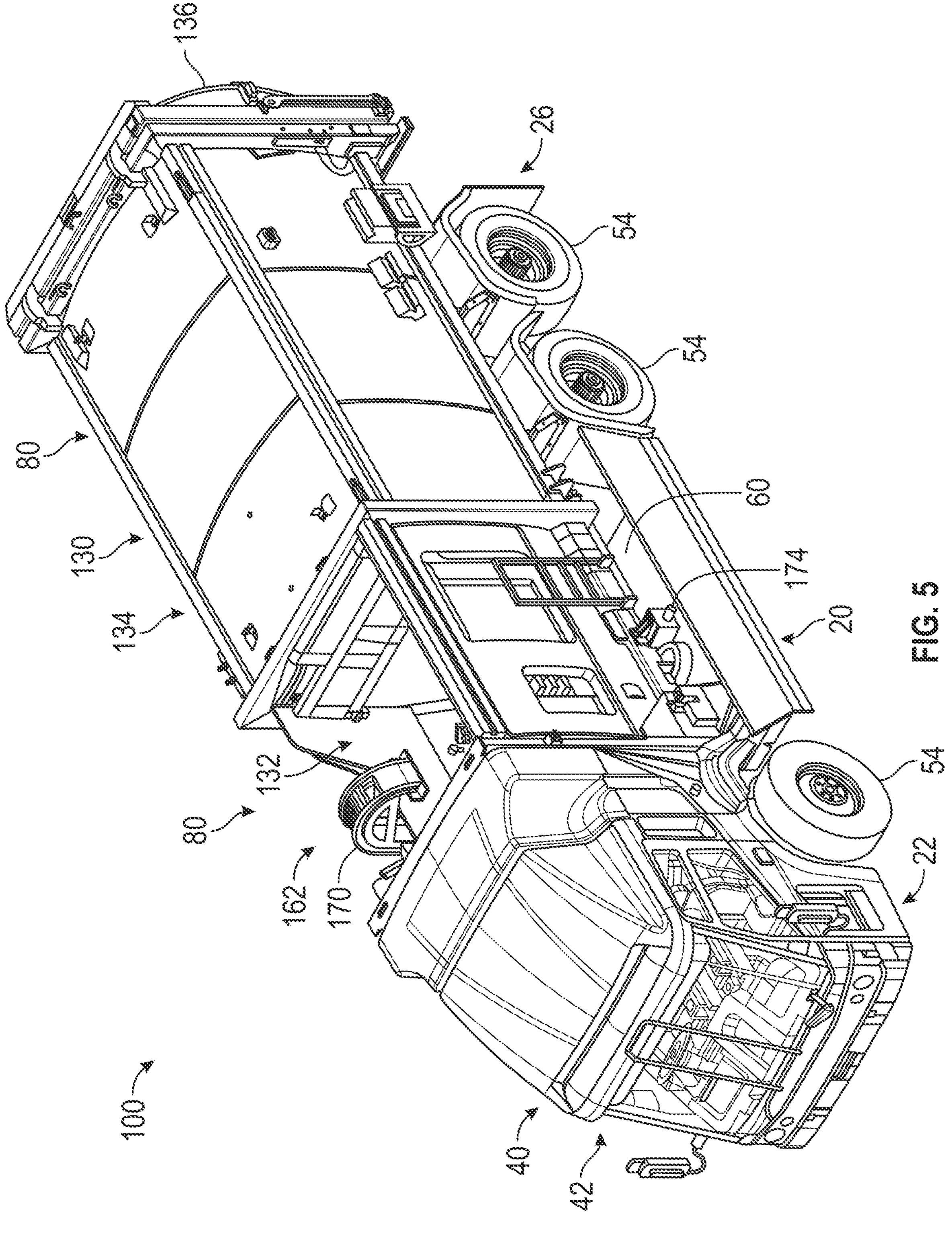
FIG. 5 is a perspective view of the vehicle of FIG. 1 configured as a side-loading refuse vehicle, according to an exemplary embodiment.
Figure 6:
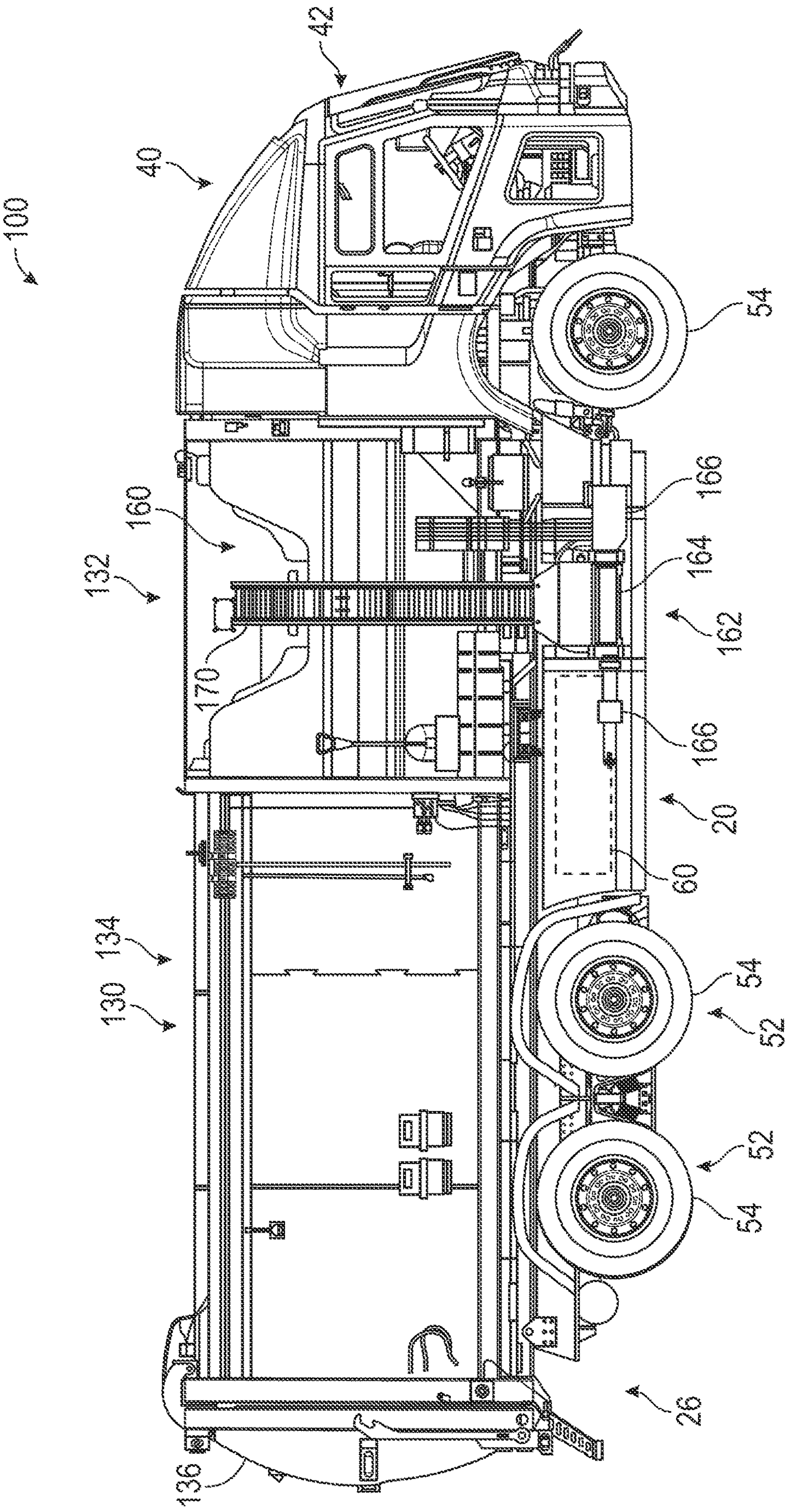
FIG. 6 is a right side view of the side-loading refuse vehicle of FIG. 5.
Figure 7:
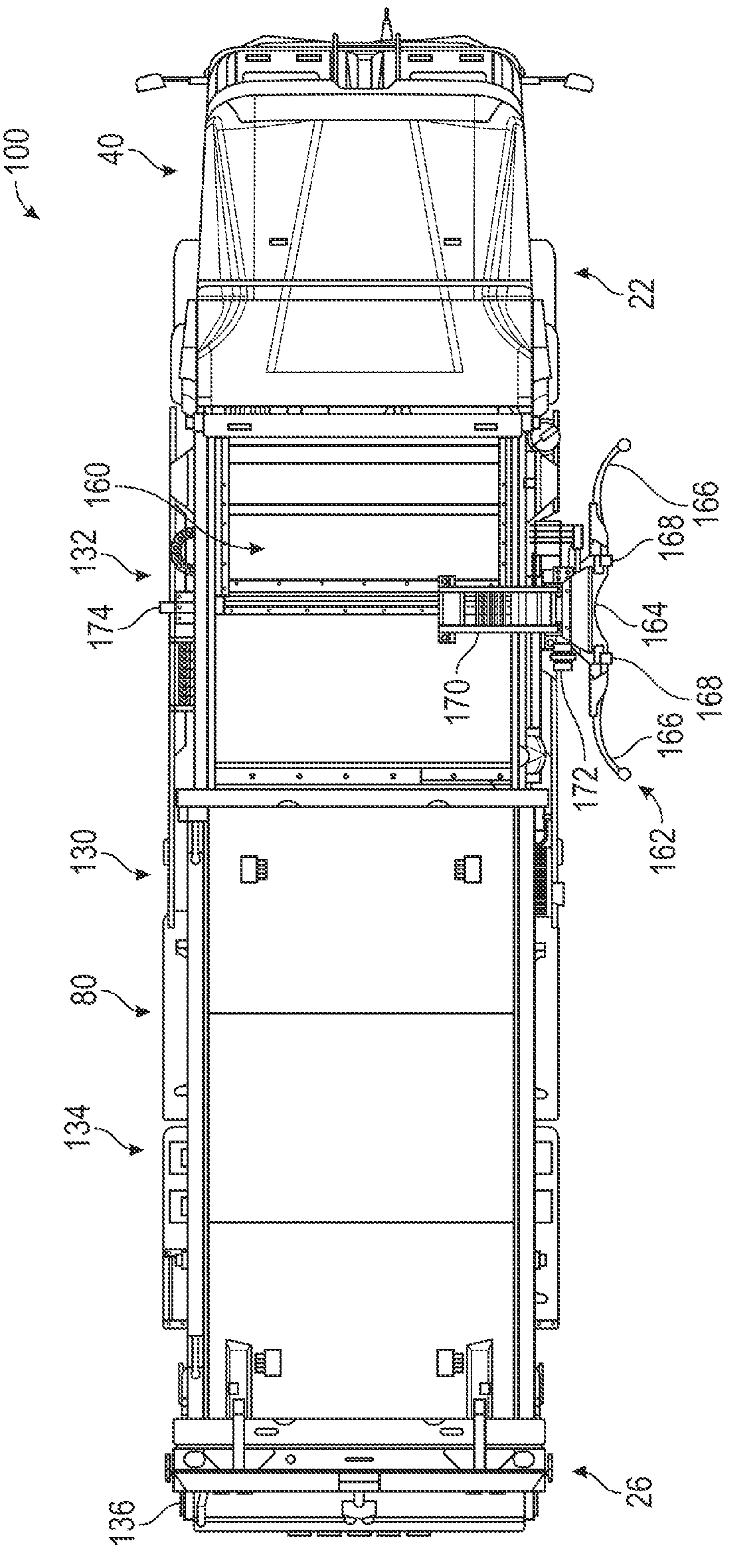
FIG. 7 is a top view of the side-loading refuse vehicle of FIG. 5.
Figure 8:
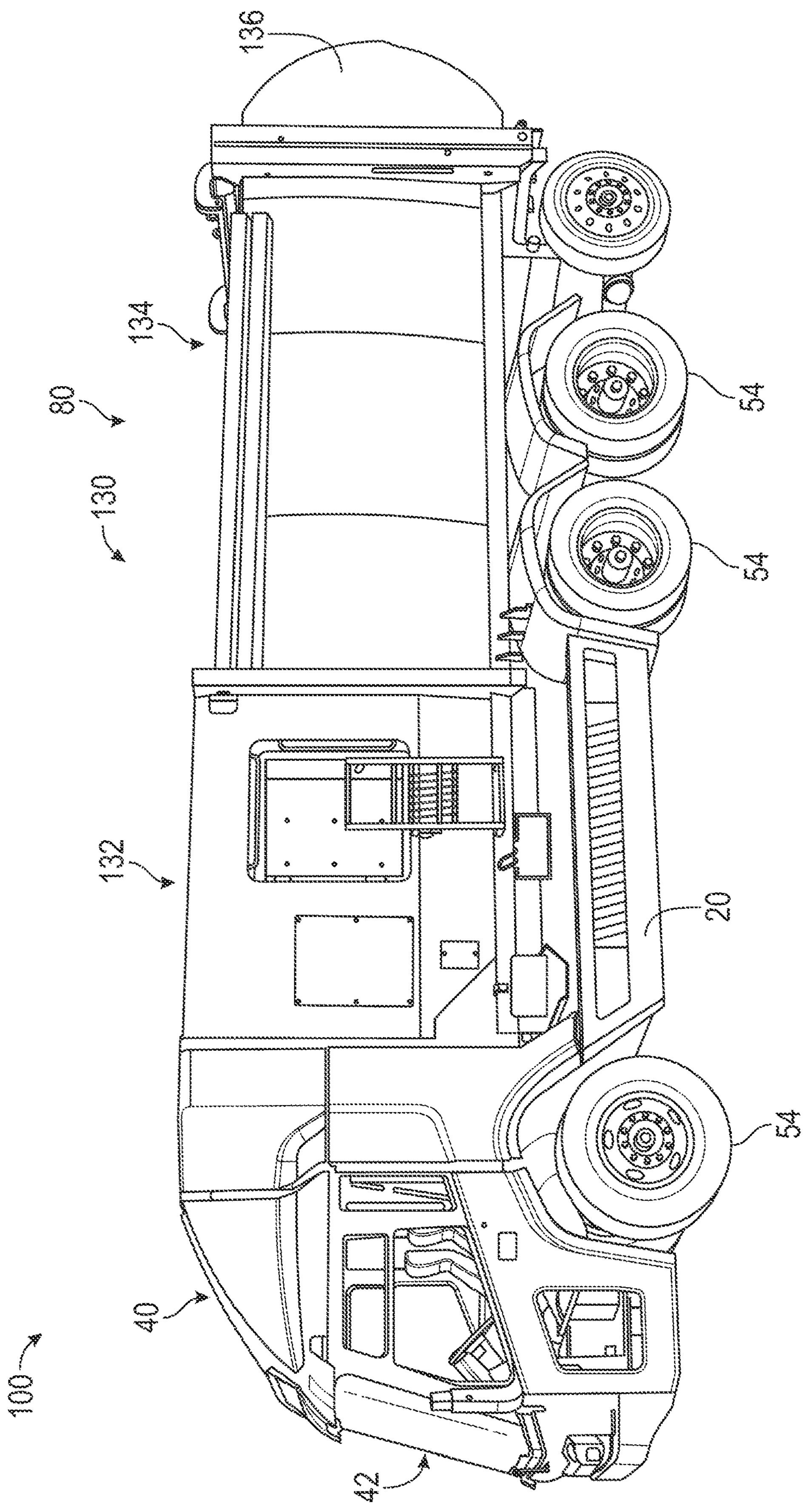
FIG. 8 is a left side view of the side-loading refuse vehicle of FIG. 5 configured with a tag axle.

Referring now to FIGS. 5-8, an alternative configuration of the refuse vehicle 100 is shown according to an exemplary embodiment. Specifically, the refuse vehicle 100 of FIGS. 5-8 is configured as a side-loading refuse vehicle. The refuse vehicle 100 of FIGS. 5-8 may be substantially similar to the front-loading refuse vehicle 100 of FIGS. 3 and 4 except as otherwise specified herein. As shown, the refuse vehicle 100 of FIGS. 5-7 is configured with a tag axle 90 in FIG. 8.

Referring still to FIGS. 5-8, the refuse vehicle 100 omits the lift assembly 140 and instead includes a side-loading lift assembly, shown as lift assembly 160, that extends laterally outward from a side of the refuse vehicle 100. The lift assembly 160 includes an interface assembly, shown as grabber assembly 162, that is configured to engage a refuse container (e.g., a residential garbage can) to selectively couple the refuse container to the lift assembly 160. The grabber assembly 162 includes a main portion, shown as main body 164, and a pair of fingers or interface members, shown as grabber fingers 166. The grabber fingers 166 are pivotally coupled to the main body 164 such that the grabber fingers 166 are each rotatable about a vertical axis. A pair of actuators (e.g., hydraulic motors, electric motors, etc.), shown as finger actuators 168, are configured to control movement of the grabber fingers 166 relative to the main body 164.

The grabber assembly 162 is movably coupled to a guide, shown as track 170, that extends vertically along a side of the refuse vehicle 100. Specifically, the main body 164 is slidably coupled to the track 170 such that the main body 164 is repositionable along a length of the track 170. An actuator (e.g., a hydraulic motor, an electric motor, etc.), shown as lift actuator 172, is configured to control movement of the grabber assembly 162 along the length of the track 170. In some embodiments, a bottom end portion of the track 170 is straight and substantially vertical such that the grabber assembly 162 raises or lowers a refuse container when moving along the bottom end portion of the track 170. In some embodiments, a top end portion of the track 170 is curved such that the grabber assembly 162 inverts a refuse container to dump refuse into the hopper volume 132 when moving along the top end portion of the track 170.

The lift assembly 160 further includes an actuator (e.g., a hydraulic cylinder, an electric linear actuator, etc.), shown as track actuator 174, that is configured to control lateral movement of the grabber assembly 162. By way of example, the track actuator 174 may be coupled to the chassis 20 and the track 170 such that the track actuator 174 moves the track 170 and the grabber assembly 162 laterally relative to the chassis 20. The track actuator 174 may facilitate repositioning the grabber assembly 162 to pick up and replace refuse containers that are spaced laterally outward from the refuse vehicle 100.

C. Concrete Mixer Truck

Figure 9:
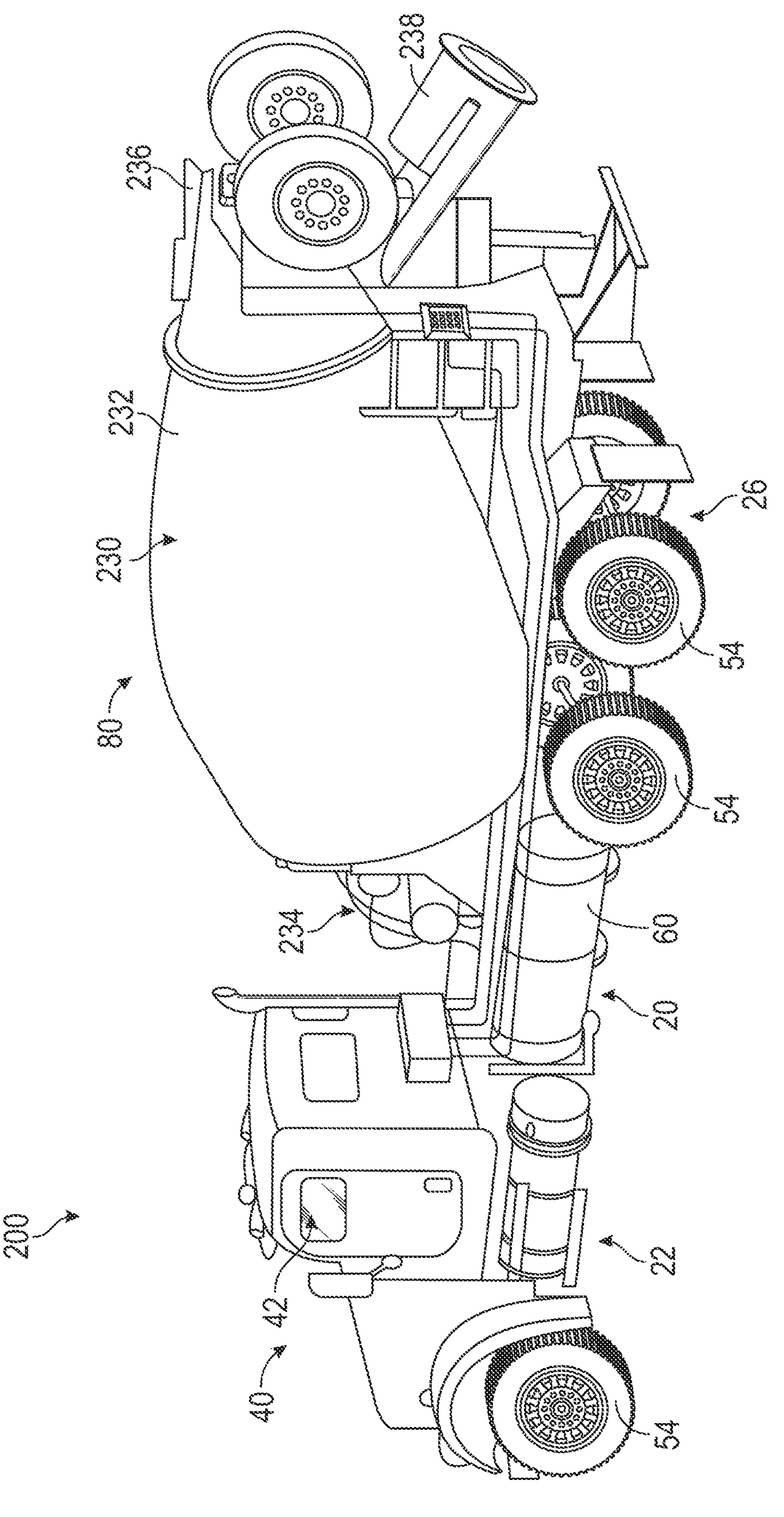
FIG. 9 is a perspective view of the vehicle of FIG. 1 configured as a mixer vehicle, according to an exemplary embodiment.

Referring now to FIG. 9, the vehicle 10 is configured as a mixer truck (e.g., a concrete mixer truck, a mixer vehicle, etc.), shown as mixer truck 200. Specifically, the mixer truck 200 is shown as a rear-discharge concrete mixer truck. In other embodiments, the mixer truck 200 is a front-discharge concrete mixer truck.

As shown in FIG. 9, the application kit 80 includes a mixing drum assembly (e.g., a concrete mixing drum), shown as drum assembly 230. The drum assembly 230 may include a mixing drum 232, a drum drive system 234 (e.g., a rotational actuator or motor, such as an electric motor or hydraulic motor), an inlet portion, shown as hopper 236, and an outlet portion, shown as chute 238. The mixing drum 232 may be coupled to the chassis 20 and may be disposed behind the cab 40 (e.g., at the rear and/or middle of the chassis 20). In an exemplary embodiment, the drum drive system 234 is coupled to the chassis 20 and configured to selectively rotate the mixing drum 232 about a central, longitudinal axis. According to an exemplary embodiment, the central, longitudinal axis of the mixing drum 232 may be elevated from the chassis 20 (e.g., from a horizontal plane extending along the chassis 20) at an angle in the range of five degrees to twenty degrees. In other embodiments, the central, longitudinal axis may be elevated by less than five degrees (e.g., four degrees, etc.). In yet another embodiment, the mixer truck 200 may include an actuator positioned to facilitate adjusting the central, longitudinal axis to a desired or target angle (e.g., manually in response to an operator input/command, automatically according to a control system, etc.).

The mixing drum 232 may be configured to receive a mixture, such as a concrete mixture (e.g., cementitious material, aggregate, sand, etc.), through the hopper 236. In some embodiments, the mixer truck 200 includes an injection system (e.g., a series of nozzles, hoses, and/or valves) including an injection valve that selectively fluidly couples a supply of fluid to the inner volume of the mixing drum 232. By way of example, the injection system may be used to inject water and/or chemicals (e.g., air entrainers, water reducers, set retarders, set accelerators, superplasticizers, corrosion inhibitors, coloring, calcium chloride, minerals, and/or other concrete additives, etc.) into the mixing drum 232. The injection valve may facilitate injecting water and/or chemicals from a fluid reservoir (e.g., a water tank, etc.) into the mixing drum 232, while preventing the mixture in the mixing drum 232 from exiting the mixing drum 232 through the injection system. In some embodiments, one or more mixing elements (e.g., fins, etc.) may be positioned in the interior of the mixing drum 232, and may be configured to agitate the contents of the mixture when the mixing drum 232 is rotated in a first direction (e.g., counterclockwise, clockwise, etc.), and drive the mixture out through the chute 238 when the mixing drum 232 is rotated in a second direction (e.g., clockwise, counterclockwise, etc.). In some embodiments, the chute 238 may also include an actuator positioned such that the chute 238 may be selectively pivotable to position the chute 238 (e.g., vertically, laterally, etc.), for example at an angle at which the mixture is expelled from the mixing drum 232.

D. Fire Truck

Figure 10:
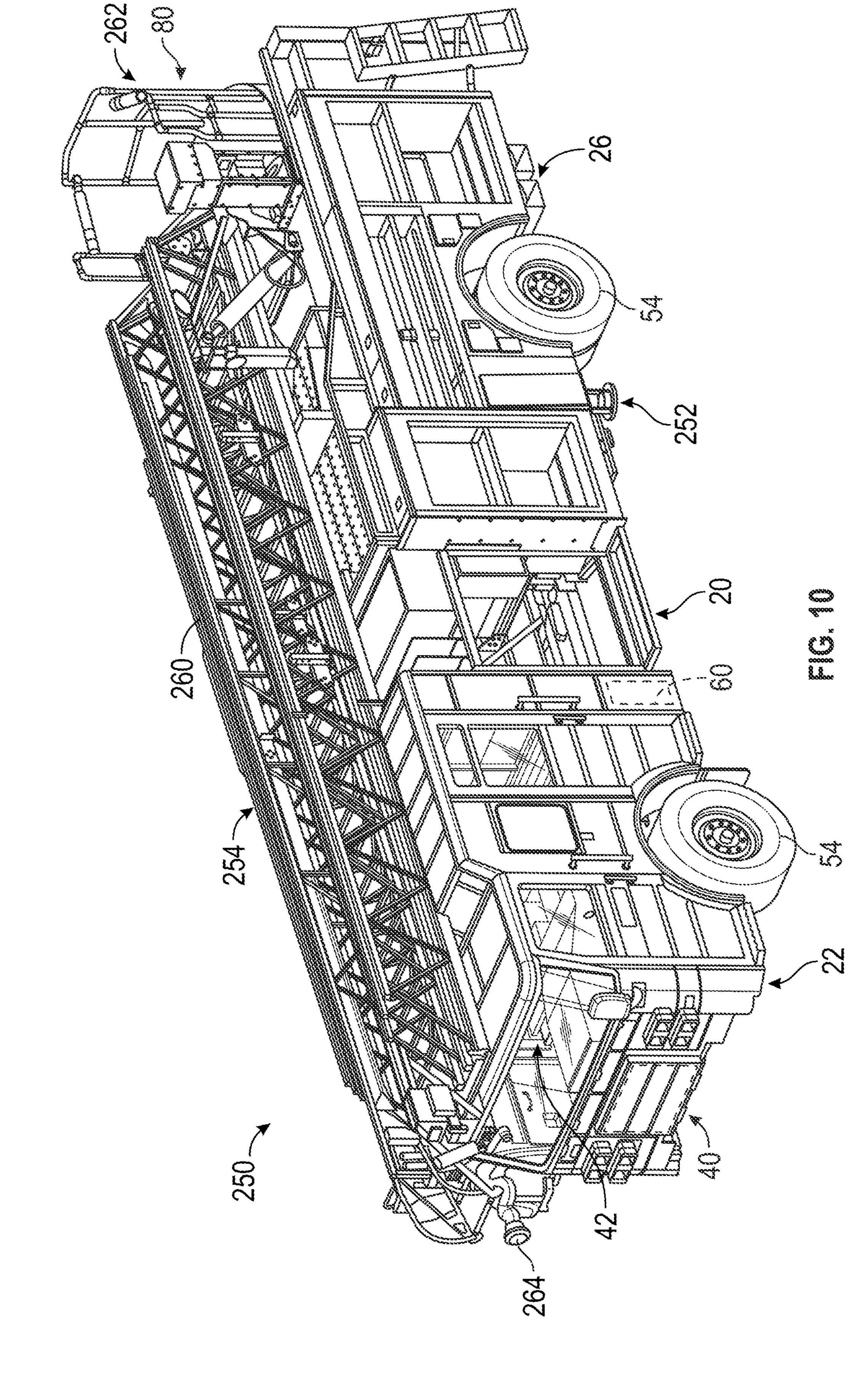
FIG. 10 is a perspective view of the vehicle of FIG. 1 configured as a fire fighting vehicle, according to an exemplary embodiment.

Referring now to FIG. 10, the vehicle 10 is configured as a fire fighting vehicle, fire truck, or fire apparatus (e.g., a turntable ladder truck, a pumper truck, a quint, etc.), shown as fire fighting vehicle 250. In the embodiment shown in FIG. 10, the fire fighting vehicle 250 is configured as a rear-mount aerial ladder truck. In other embodiments, the fire fighting vehicle 250 is configured as a mid-mount aerial ladder truck, a quint fire truck (e.g., including an onboard water storage, a hose storage, a water pump, etc.), a tiller fire truck, a pumper truck (e.g., without an aerial ladder), or another type of response vehicle. By way of example, the vehicle 10 may be configured as a police vehicle, an ambulance, a tow truck, or still other vehicles used for responding to a scene (e.g., an accident, a fire, an incident, etc.).

As shown in FIG. 10, in the fire fighting vehicle 250, the application kit 80 is positioned mainly rearward from the cab 40. The application kit 80 includes deployable stabilizers (e.g., outriggers, downriggers, etc.), shown as outriggers 252, that are coupled to the chassis 20. The outriggers 252 may be configured to selectively extend from each lateral side and/or the rear of the fire fighting vehicle 250 and engage a support surface (e.g., the ground) in order to provide increased stability while the fire fighting vehicle 250 is stationary. The fire fighting vehicle 250 further includes an extendable or telescoping ladder assembly, shown as ladder assembly 254. The increased stability provided by the outriggers 252 is desirable when the ladder assembly 254 is in use (e.g., extended from the fire fighting vehicle 250) to prevent tipping. In some embodiments, the application kit 80 further includes various storage compartments (e.g., cabinets, lockers, etc.) that may be selectively opened and/or accessed for storage and/or component inspection, maintenance, and/or replacement.

As shown in FIG. 10, the ladder assembly 254 includes a series of ladder sections 260 that are slidably coupled with one another such that the ladder sections 260 may extend and/or retract (e.g., telescope) relative to one another to selectively vary a length of the ladder assembly 254. A base platform, shown as turntable 262, is rotatably coupled to the chassis 20 and to a proximal end of a base ladder section 260 (i.e., the most proximal of the ladder sections 260). The turntable 262 may be configured to rotate about a vertical axis relative to the chassis 20 to rotate the ladder sections 260 about the vertical axis (e.g., up to 360 degrees, etc.). The ladder sections 260 may rotate relative to the turntable 262 about a substantially horizontal axis to selectively raise and lower the ladder sections 260 relative to the chassis 20. As shown, a water turret or implement, shown as monitor 264, is coupled to a distal end of a fly ladder section 260 (i.e., the most distal of the ladder sections 260). The monitor 264 may be configured to expel water and/or a fire suppressing agent (e.g., foam, etc.) from a water storage tank and/or an agent tank onboard the fire fighting vehicle 250, and/or from an external source (e.g., a fire hydrant, a separate water/pumper truck, etc.). In some embodiments, the ladder assembly 254 further includes an aerial platform coupled to the distal end of the fly ladder section 260 and configured to support one or more operators.

E. ARFF Truck

Figure 11:
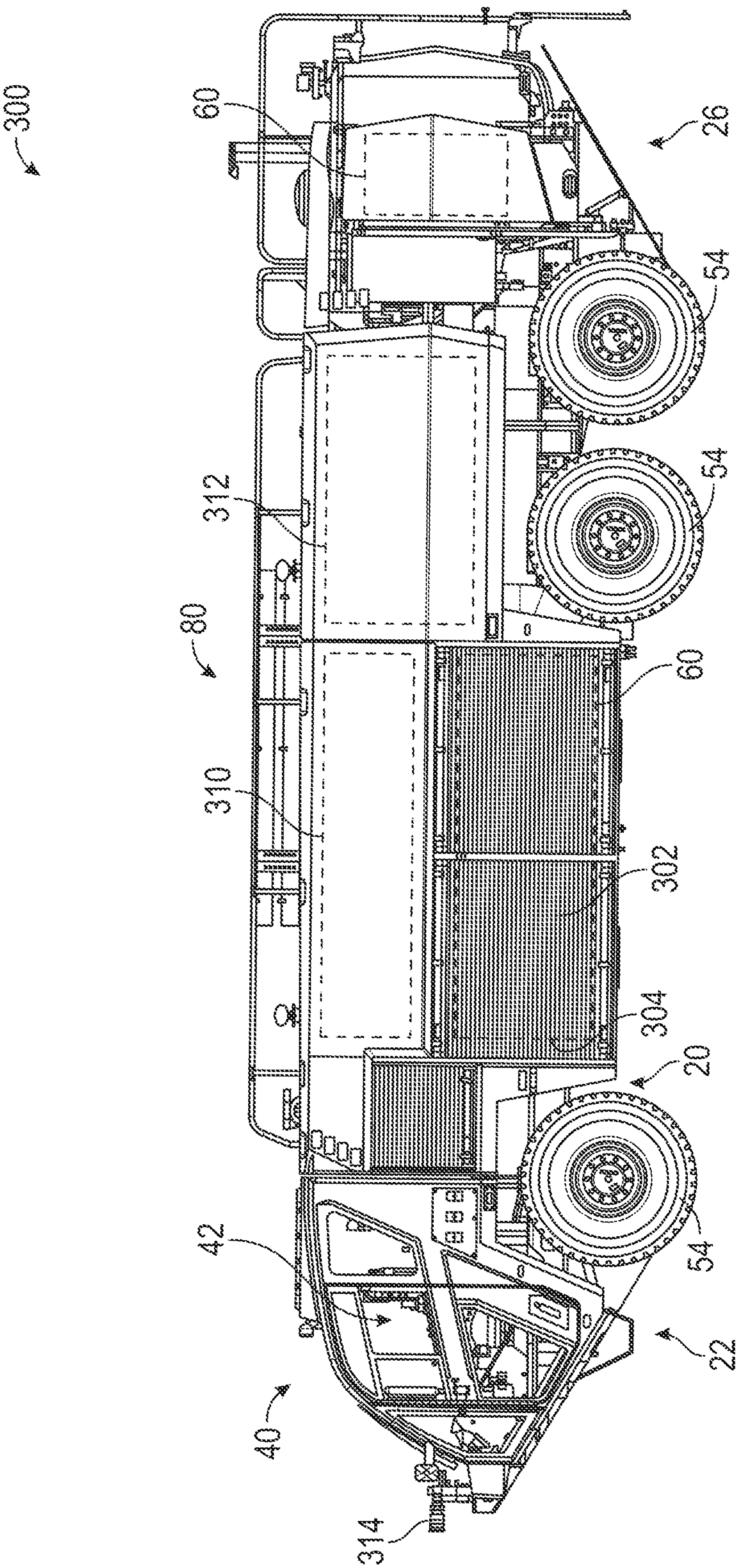
FIG. 11 is a left side view of the vehicle of FIG. 1 configured as an airport fire fighting vehicle, according to an exemplary embodiment.

Referring now to FIG. 11, the vehicle 10 is configured as a fire fighting vehicle, shown as airport rescue and fire fighting (ARFF) truck 300. As shown in FIG. 11, the application kit 80 is positioned primarily rearward of the cab 40. As shown, the application kit 80 includes a series of storage compartments or cabinets, shown as compartments 302, that are coupled to the chassis 20. The compartments 302 may store various equipment or components of the ARFF truck 300.

The application kit 80 includes a pump system 304 (e.g., an ultra-high-pressure pump system, etc.) positioned within one of the compartments 302 near the center of the ARFF truck 300. The application kit 80 further includes a water tank 310, an agent tank 312, and an implement or water turret, shown as monitor 314. The pump system 304 may include a high pressure pump and/or a low pressure pump, which may be fluidly coupled to the water tank 310 and/or the agent tank 312. The pump system 304 may to pump water and/or fire suppressing agent from the water tank 310 and the agent tank 312, respectively, to the monitor 314. The monitor 314 may be selectively reoriented by an operator to adjust a direction of a stream of water and/or agent. As shown in FIG. 11, the monitor 314 is coupled to a front end of the cab 40.

F. Boom Lift

Figure 12:
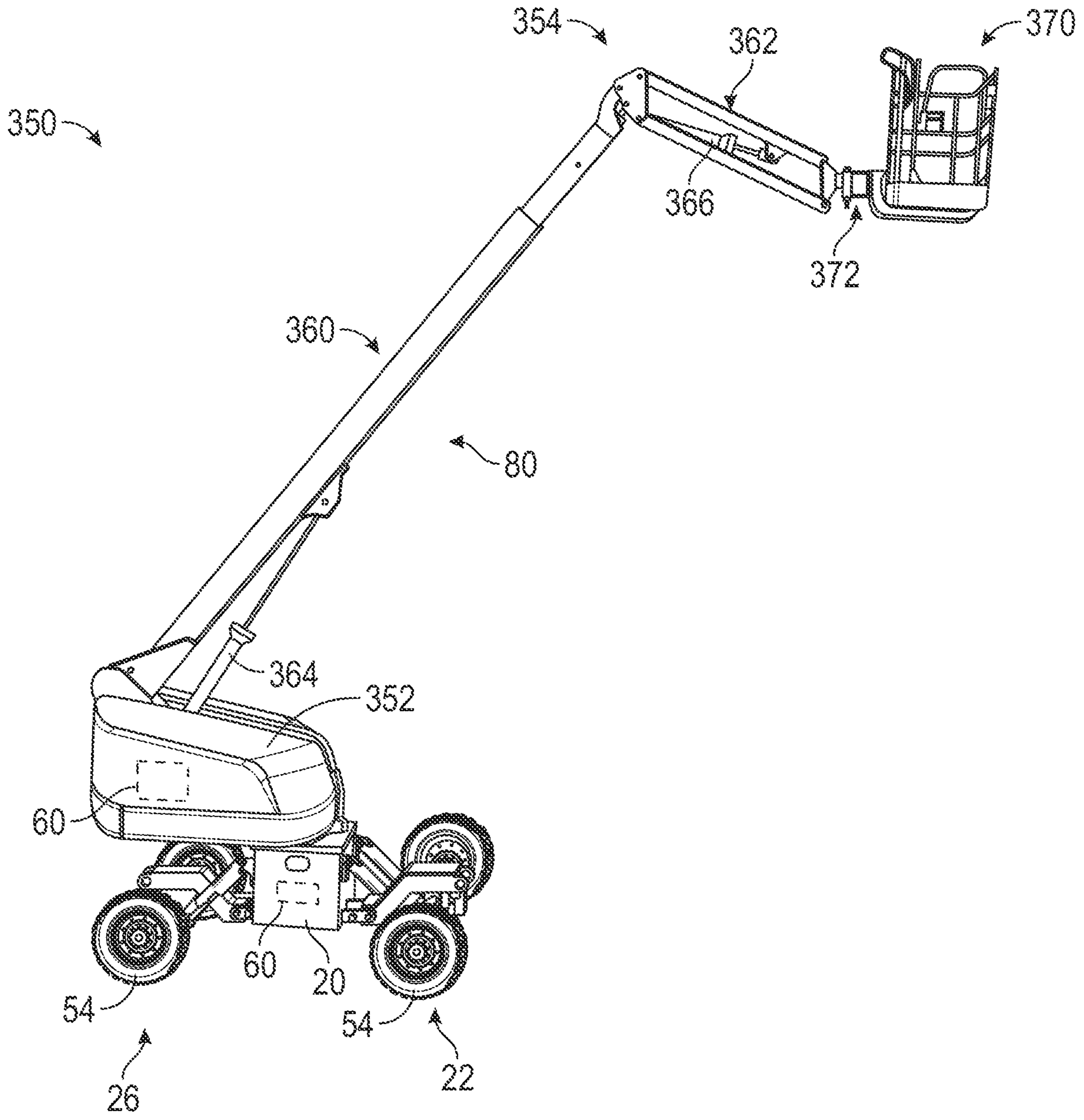
FIG. 12 is a perspective view of the vehicle of FIG. 1 configured as a boom lift, according to an exemplary embodiment.

Referring now to FIG. 12, the vehicle 10 is configured as a lift device, shown as boom lift 350. The boom lift 350 may be configured to support and elevate one or more operators. In other embodiments, the vehicle 10 is configured as another type of lift device that is configured to lift operators and/or material, such as a skid-loader, a telehandler, a scissor lift, a fork lift, a vertical lift, and/or any other type of lift device or machine.

As shown in FIG. 12, the application kit 80 includes a base assembly, shown as turntable 352, that is rotatably coupled to the chassis 20. The turntable 352 may be configured to selectively rotate relative to the chassis 20 about a substantially vertical axis. In some embodiments, the turntable 352 includes a counterweight (e.g., the batteries) positioned near the rear of the turntable 352. The turntable 352 is rotatably coupled to a lift assembly, shown as boom assembly 354. The boom assembly 354 includes a first section or telescoping boom section, shown as lower boom 360. The lower boom 360 includes a series of nested boom sections that extend and retract (e.g., telescope) relative to one another to vary a length of the boom assembly 354. The boom assembly 354 further includes a second boom section or four bar linkage, shown as upper boom 362. The upper boom 362 may includes structural members that rotate relative to one another to raise and lower a distal end of the boom assembly 354. In other embodiments, the boom assembly 354 includes more or fewer boom sections (e.g., one, three, five, etc.) and/or a different arrangement of boom sections.

As shown in FIG. 12, the boom assembly 354 includes a first actuator, shown as lower lift cylinder 364. The lower boom 360 is pivotally coupled (e.g., pinned, etc.) to the turntable 352 at a joint or lower boom pivot point. The lower lift cylinder 364 (e.g., a pneumatic cylinder, an electric linear actuator, a hydraulic cylinder, etc.) is coupled to the turntable 352 at a first end and coupled to the lower boom 360 at a second end. The lower lift cylinder 364 may be configured to raise and lower the lower boom 360 relative to the turntable 352 about the lower boom pivot point.

The boom assembly 354 further includes a second actuator, shown as upper lift cylinder 366. The upper boom 362 is pivotally coupled (e.g., pinned) to the upper end of the lower boom 360 at a joint or upper boom pivot point. The upper lift cylinder 366 (e.g., a pneumatic cylinder, an electric linear actuator, a hydraulic cylinder, etc.) is coupled to the upper boom 362. The upper lift cylinder 366 may be configured to extend and retract to actuate (e.g., lift, rotate, elevate, etc.) the upper boom 362, thereby raising and lowering a distal end of the upper boom 362.

Referring still to FIG. 12, the application kit 80 further includes an operator platform, shown as platform assembly 370, coupled to the distal end of the upper boom 362 by an extension arm, shown as jib arm 372. The jib arm 372 may be configured to pivot the platform assembly 370 about a lateral axis (e.g., to move the platform assembly 370 up and down, etc.) and/or about a vertical axis (e.g., to move the platform assembly 370 left and right, etc.).

The platform assembly 370 provides a platform configured to support one or more operators or users. In some embodiments, the platform assembly 370 may include accessories or tools configured for use by the operators. For example, the platform assembly 370 may include pneumatic tools (e.g., an impact wrench, airbrush, nail gun, ratchet, etc.), plasma cutters, welders, spotlights, etc. In some embodiments, the platform assembly 370 includes a control panel (e.g., a user interface, a removable or detachable control panel, etc.) configured to control operation of the boom lift 350 (e.g., the turntable 352, the boom assembly 354, etc.) from the platform assembly 370 or remotely. In other embodiments, the platform assembly 370 is omitted, and the boom lift 350 includes an accessory and/or tool (e.g., forklift forks, etc.) coupled to the distal end of the boom assembly 354.

G. Scissor Lift

Figure 13:
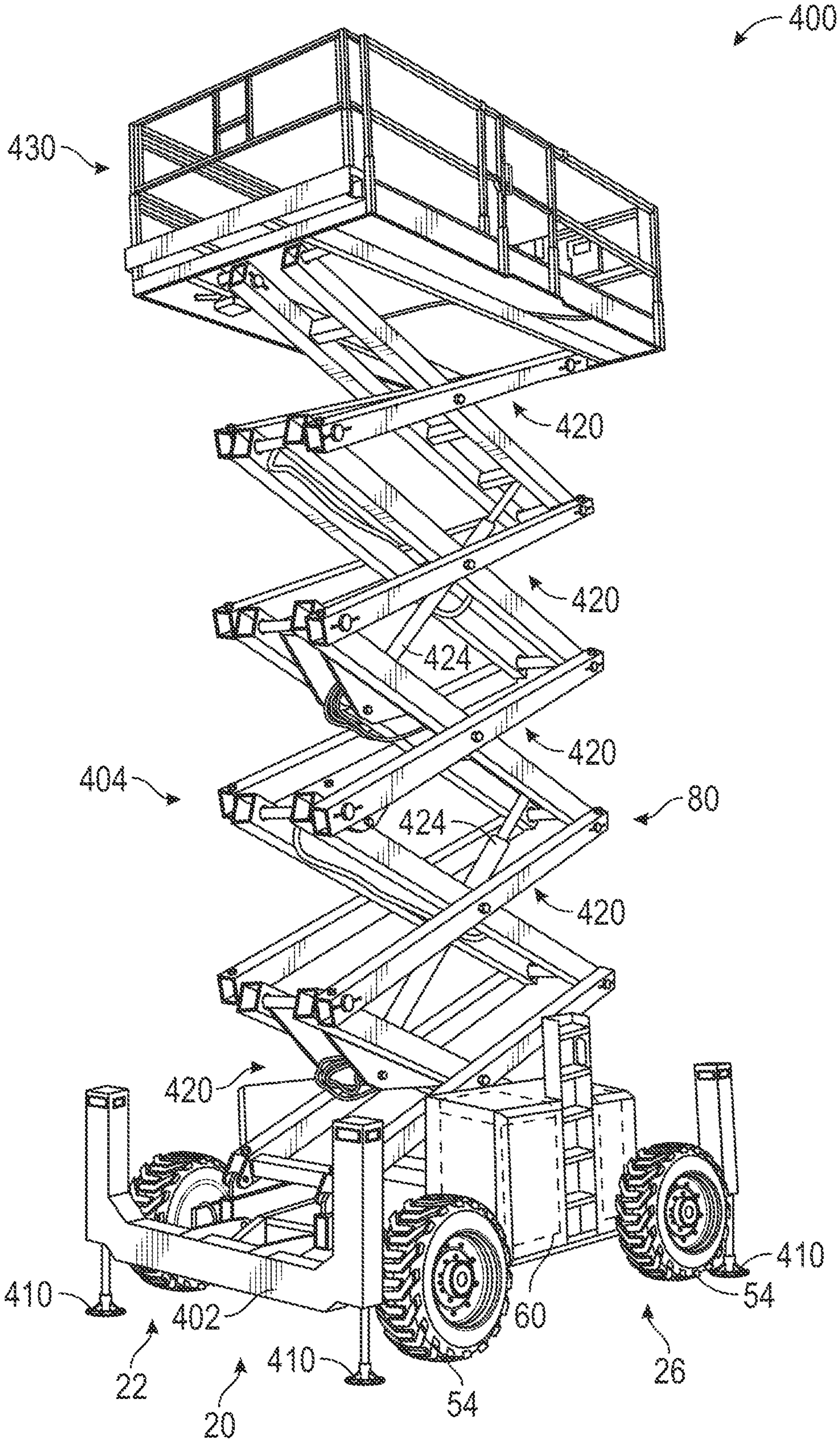
FIG. 13 is a perspective view of the vehicle of FIG. 1 configured as a scissor lift, according to an exemplary embodiment.

Referring now to FIG. 13, the vehicle 10 is configured as a lift device, shown as scissor lift 400. As shown in FIG. 13, the application kit 80 includes a body, shown as lift base 402, coupled to the chassis 20. The lift base 402 is coupled to a scissor assembly, shown as lift assembly 404, such that the lift base 402 supports the lift assembly 404. The lift assembly 404 is configured to extend and retract, raising and lowering between a raised position and a lowered position relative to the lift base 402.

As shown in FIG. 13, the lift base 402 includes a series of actuators, stabilizers, downriggers, or outriggers, shown as leveling actuators 410. The leveling actuators 410 may extend and retract vertically between a stored position and a deployed position. In the stored position, the leveling actuators 410 may be raised, such that the leveling actuators 410 do not contact the ground. Conversely, in the deployed position, the leveling actuators 410 may engage the ground to lift the lift base 402. The length of each of the leveling actuators 410 in their respective deployed positions may be varied in order to adjust the pitch (e.g., rotational position about a lateral axis) and the roll (e.g., rotational position about a longitudinal axis) of the lift base 402 and/or the chassis 20. Accordingly, the lengths of the leveling actuators 410 in their respective deployed positions may be adjusted to level the lift base 402 with respect to the direction of gravity (e.g., on uneven, sloped, pitted, etc. terrain). The leveling actuators 410 may lift the wheel and tire assemblies 54 off of the ground to prevent movement of the scissor lift 400 during operation. In other embodiments, the leveling actuators 410 are omitted.

The lift assembly 404 may include a series of subassemblies, shown as scissor layers 420, each including a pair of inner members and a pair of outer members pivotally coupled to one another. The scissor layers 420 may be stacked atop one another in order to form the lift assembly 404, such that movement of one scissor layer 420 causes a similar movement in all of the other scissor layers 420. The scissor layers 420 extend between and couple the lift base 402 and an operator platform (e.g., the platform assembly 430). In some embodiments, scissor layers 420 may be added to, or removed from, the lift assembly 404 in order to increase, or decrease, the fully extended height of the lift assembly 404.

Referring still to FIG. 13, the lift assembly 404 may also include one or more lift actuators 424 (e.g., hydraulic cylinders, pneumatic cylinders, electric linear actuators such as motor-driven leadscrews, etc.) configured to extend and retract the lift assembly 404. The lift actuators 424 may be pivotally coupled to inner members of various scissor layers 420, or otherwise arranged within the lift assembly 404.

A distal or upper end of the lift assembly 404 is coupled to an operator platform, shown as platform assembly 430. The platform assembly 430 may perform similar functions to the platform assembly 370, such as supporting one or more operators, accessories, and/or tools. The platform assembly 430 may include a control panel to control operation of the scissor lift 400. The lift actuators 424 may be configured to actuate the lift assembly 404 to selectively reposition the platform assembly 430 between a lowered position (e.g., where the platform assembly 430 is proximate to the lift base 402) and a raised position (e.g., where the platform assembly 430 is at an elevated height relative to the lift base 402). Specifically, in some embodiments, extension of the lift actuators 424 moves the platform assembly 430 upward (e.g., extending the lift assembly 404), and retraction of the lift actuators 424 moves the platform assembly 430 downward (e.g., retracting the lift assembly 404). In other embodiments, extension of the lift actuators 424 retracts the lift assembly 404, and retraction of the lift actuators 424 extends the lift assembly 404.

Unibody Refuse Vehicle

Referring generally to FIGS. 14-21, a vehicle body 500 is shown, according to an exemplary embodiment. The vehicle body 500 may be configured for use in any vehicle described above (e.g., vehicle 10, vehicle 100, mixer truck 200, truck 300, etc.). The vehicle may be utilized as an electric vehicle. As will be discussed in greater detailed herein, the vehicle body 500 may be configured to rigidly hold the vehicle in place. The vehicle body 500 may include a frame, rail, chassis, or the like, shown as frame structure 510. The frame structure 510 may extend along a portion of an underside of the vehicle body 500. In other embodiments, the frame structure 510 may extend along an entirety of the underside of the vehicle body 500. The vehicle body 500 may include one or more axle assemblies, shown as axle assembly 520. The axle assembly 520 may include one or more tire assemblies, shown as tire assembly 525. The tire assembly 525 may be coupled to respective ends of the axle assembly 520. For example, if the vehicle body 500 includes two axle assemblies 520, the vehicle body 500 may include four tire assemblies 525 coupled to the axle assemblies 520.

The vehicle body 500 may include a body, tubular member, or the like, shown as body 530. The body 530 may be defined as an elongated body that extends along the frame structure 510. The body 530 may include an upper portion 530*a*, a middle portion 530*b*, and a lower portion 530*c*. The upper portion 530*a* may be geometrically similar to the lower portion 530*c*. The portions 530*a*-530*c* may be coupled together to cooperatively define the body 530. According to an exemplary embodiment, the portions 530*a*-530*c* may be coupled together using any suitable manufacturing method (e.g., welding, crimping, extruding, etc.). By way of example, the portions 530*a*-530*c* may be welded together to form the body 530. The body 530 may further define a hollow portion therein, where the portions 530*a*-530*c* may be provided about the hollow portion.

The vehicle body 500 may further include a battery frame 540. The battery frame 540 may be a frame structure extending from the frame structure 510. In other embodiments, the battery frame 540 may be built in to the frame structure 510. The battery frame 540 may be configured to hold one or more battery modules, shown as battery module 550. The battery module 550 may be positioned on top of the battery frame 540, between the battery frame 540 and the body 530. In other embodiments, the battery module 550 may be positioned underneath the battery frame 540. In still other embodiments, the battery module 550 may be positioned within the body 530. The battery module 550 may be configured to supply power to the vehicle.

The vehicle body 500 may further include one or more side supports, cab supports, brackets, or the like, shown as supports 560. The supports 560 may be elongated supports that extend along an underside of the body 530. In other embodiments, the supports 560 may be integrated into the body 530. The supports 560 may be configured to receive a cab. As can be appreciated, the supports 560 may be fixedly coupled to the body 530 and the cab, such that the supports 560 rigidly couple the body 530 to the cab. The supports 560 may extend along and/or couple to respective sides of the cab.

As will be discussed in greater detail herein, the above components (e.g., frame structure 510, body 530, battery frame 540, battery module 550, and supports 560) may be arranged in multiple configurations to provide structural support to the vehicle. According to an exemplary embodiment, at least one of the frame structure 510, body 530, and battery frame 540 may cooperatively define a unitary body such to provide enhanced structural support to the vehicle body 500 and/or the vehicle.

Figure 14:
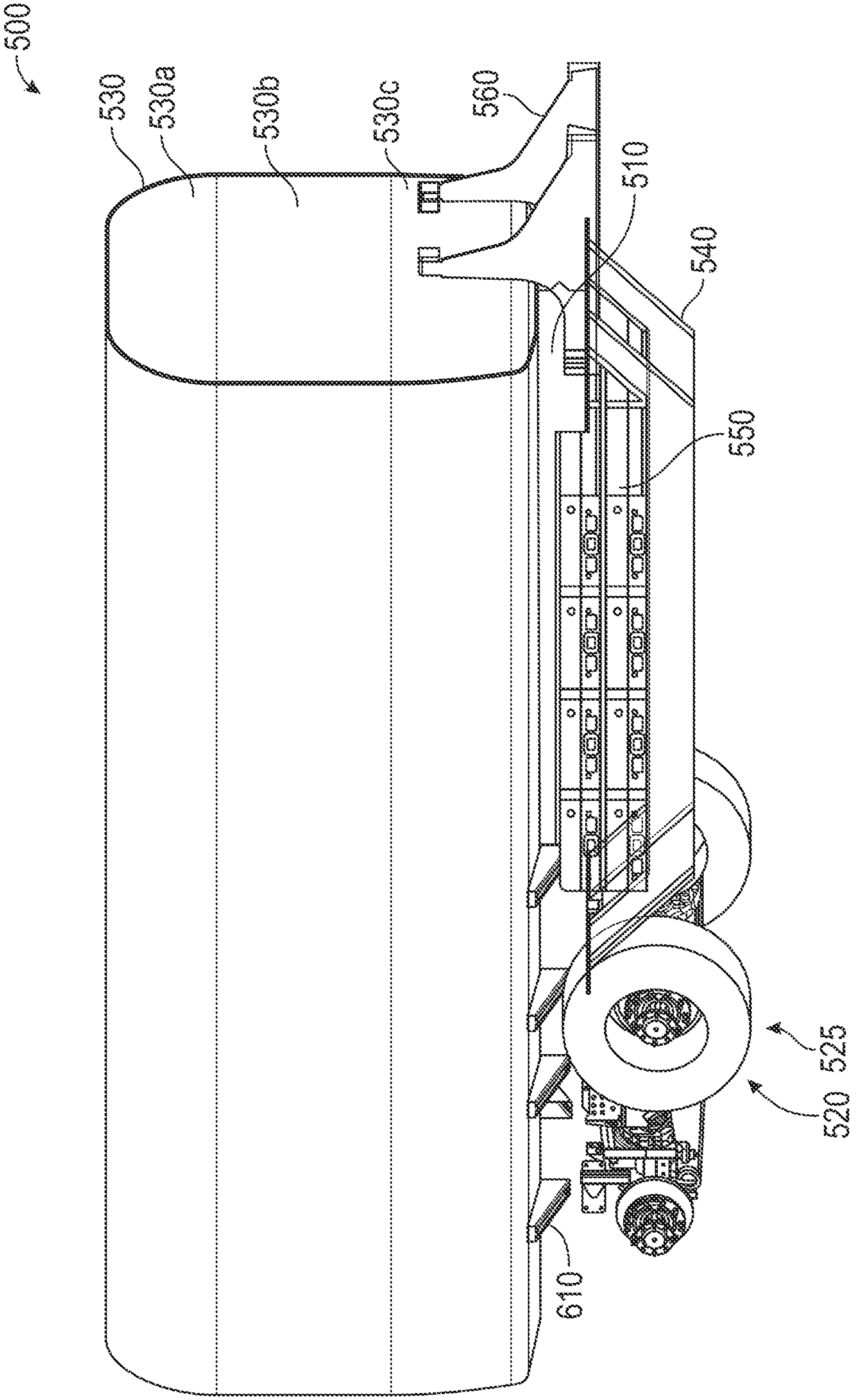
FIG. 14 is a perspective view of a vehicle body for use in the vehicle of FIG. 1, according to an exemplary embodiment.
Figure 15:
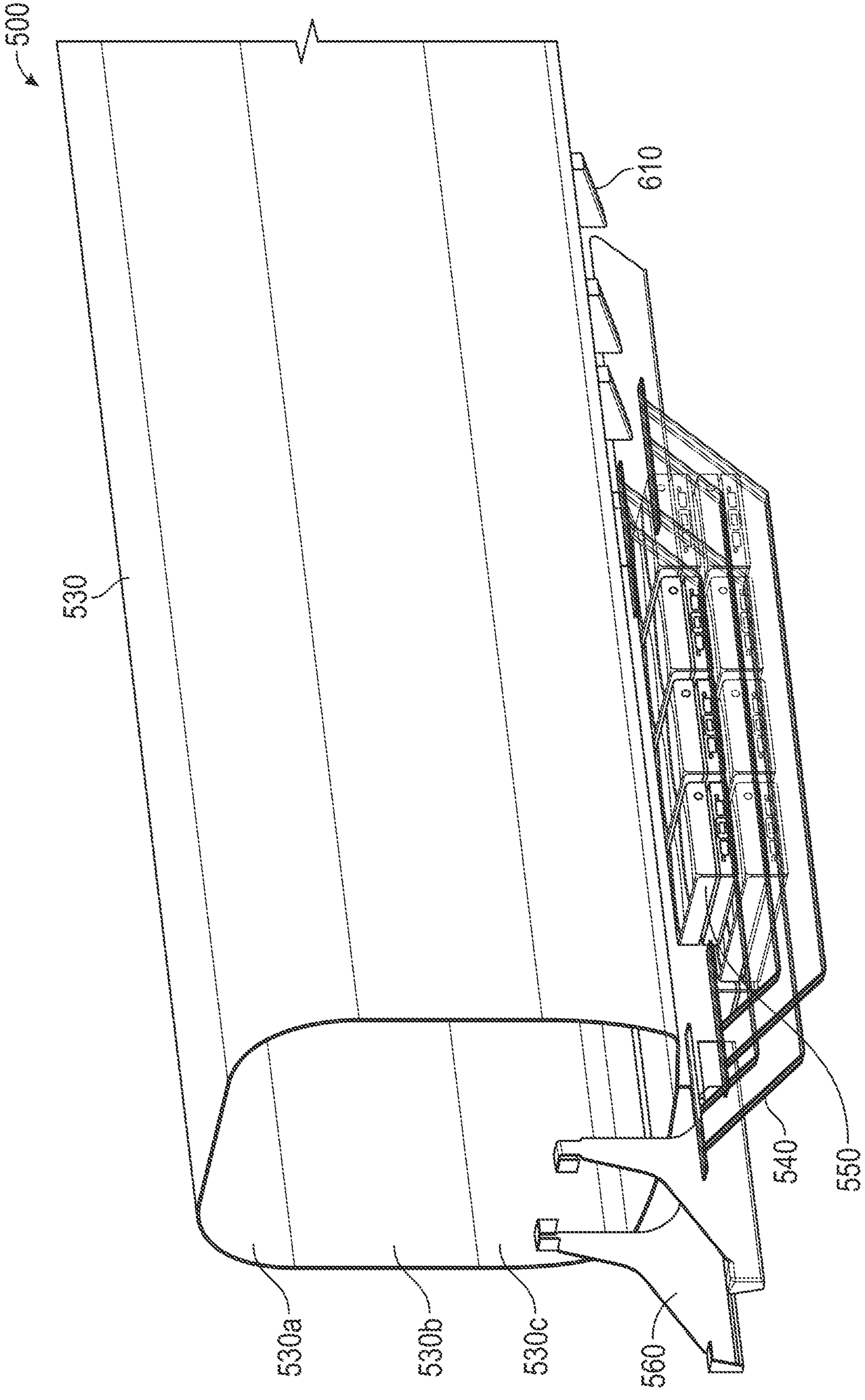
FIG. 15 is another perspective view of the vehicle body of FIG. 14, according to an exemplary embodiment.

Referring specifically to FIGS. 14 and 15, the vehicle body 500 is shown with the axle assemblies 520 and the supports 560 integrated into the body 530, according to an exemplary embodiment. As shown, the supports 560 may be integrated into the body 530 between the body 530 and the battery module 550. The supports 560 may further extend along at least a portion of a length of the body 530, where one end protrudes past the body 530. The end of the supports 560 that protrude past the body 530 may be suitable mounting locations for the cab. In other embodiments, both ends of the supports 560 may protrude past the body 530.

The body 530 may be coupled to the frame structure 510 via one or more brackets, mounting provisions, or the like, shown as brackets 610. The brackets 610 may extend between the body 530 and the frame structure 510. According to an exemplary embodiment, the brackets 610 may form a right-angle bracket having one side fixedly coupled to the body 530 and another side fixedly coupled to the frame structure 510. In other embodiments, the brackets 610 may be angular brackets that angularly extend between the body 530 and the frame structure 510. The brackets 610 may be further configured to support the body 530 into a position in which the body 530 may not vertically or horizontally move. In other embodiments, the brackets 610 may permit vertical movement of the body 530. As shown in FIG. 14, the vehicle body 500 may include eight brackets 610. As such, the brackets 610 may be positioned proximate the axle assemblies 510. In other embodiments, the vehicle body 500 may include any number of brackets 610.

The battery frame 540 may extend between the supports 560 and the axle assemblies 510. Additionally or alternatively, the battery frame 540 may be positioned substantially offset the body 530. For example, the battery frame 540 may be offset the body 530 at a position substantially similar to a position of the axle assembly 510. The offset position permits a space between the body 530 and the battery frame 540 to be positioned therein. According to an exemplary embodiment, the battery frame 540 may be configured as an additional frame structure. More specifically, the battery frame 540 may be configured to support the vehicle body 500. In other embodiments, the battery frame 540 may be configured to absorb stresses introduced to the vehicle body 500.

Figure 16:
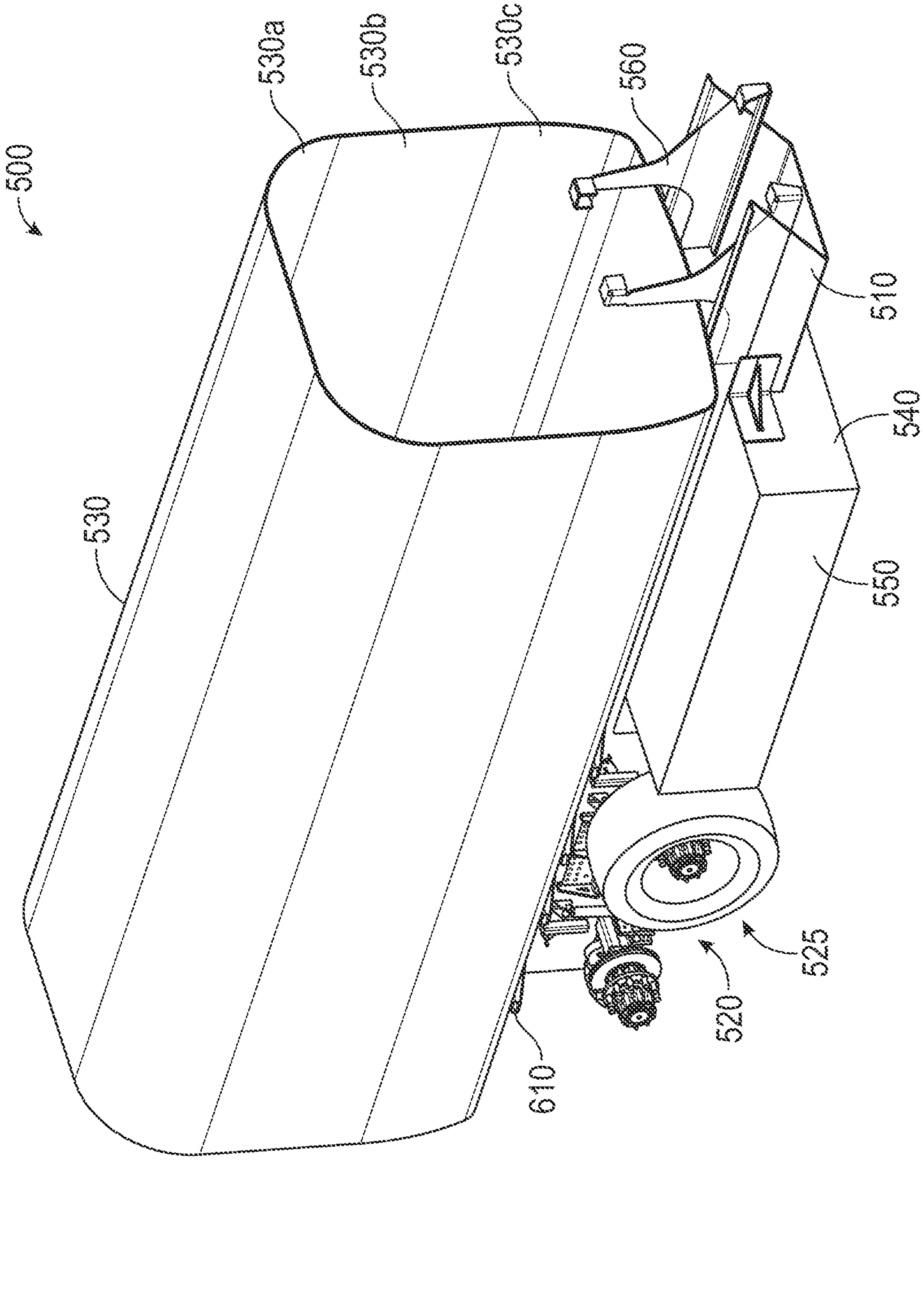
FIG. 16 is a perspective view of a vehicle body for use in the vehicle of FIG. 1, according to an exemplary embodiment.
Figure 17:
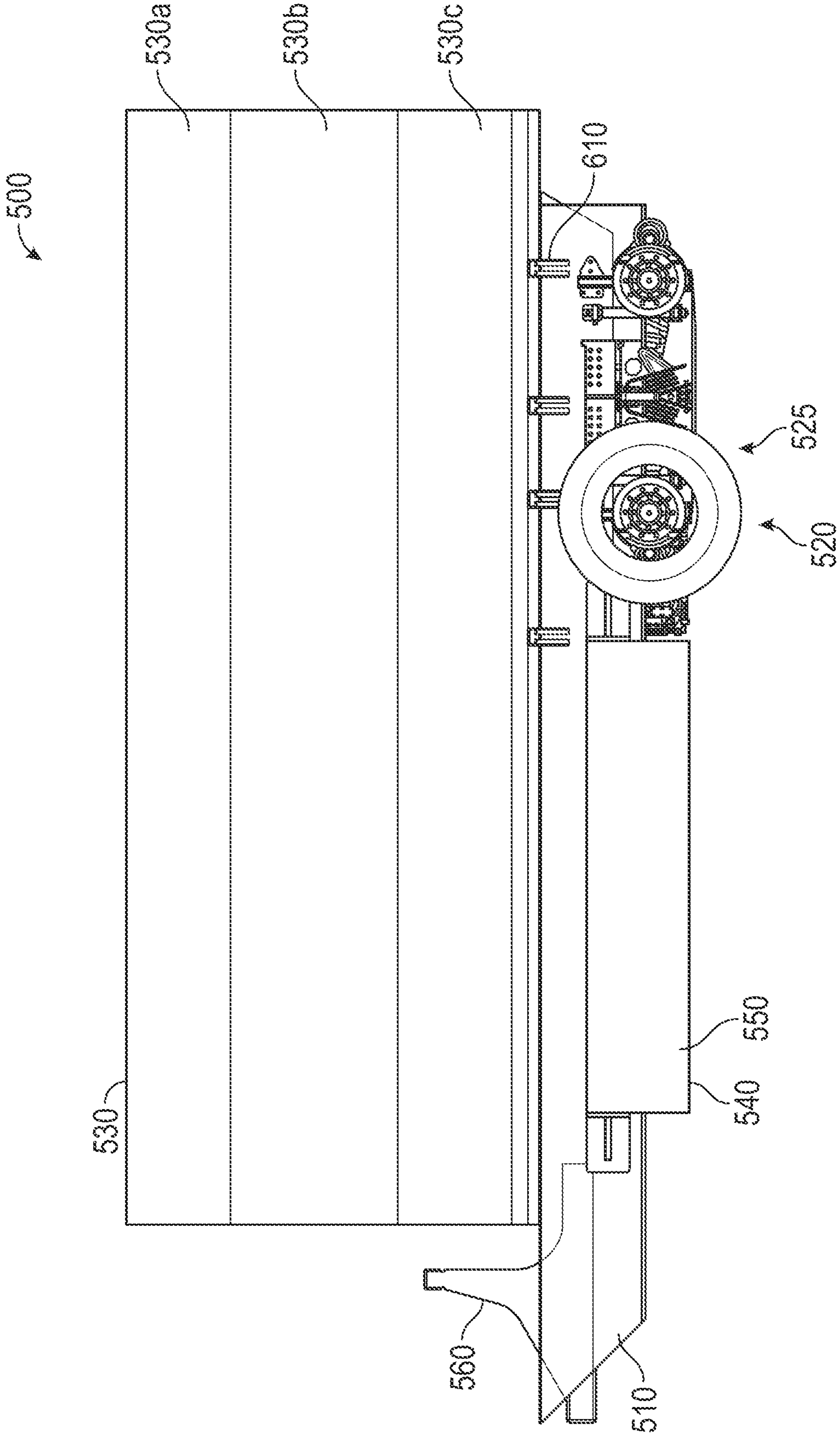
FIG. 17 is a side view of the vehicle body of FIG. 16, according to an exemplary embodiment.

Referring specifically to FIGS. 16 and 17, the vehicle body 500 is shown with the axle assemblies 520 and the supports 560 integrated into the body 530, according to another exemplary embodiment. As shown, the supports 560 may be integrated into the body 530 between the body 530 and the battery module 550. The supports 560 may further extend along at least a portion of a length of the body 530, where one end protrudes past the body 530. The end of the supports 560 that protrude past the body 530 may be suitable mounting locations for the cab. In other embodiments, both ends of the supports 560 may protrude past the body 530.

The body 530 may be coupled to the frame structure 510 via one or more brackets, mounting provisions, or the like, shown as brackets 610. The brackets 610 may extend between the body 530 and the frame structure 510. According to an exemplary embodiment, the brackets 610 may form a right-angle bracket having one side fixedly coupled to the body 530 and another side fixedly coupled to the frame structure 510. In other embodiments, the brackets 610 may be angular brackets that angularly extend between the body 530 and the frame structure 510. The brackets 610 may be further configured to support the body 530 into a position in which the body 530 may not vertically or horizontally move. In other embodiments, the brackets 610 may permit vertical movement of the body 530. As shown in FIG. 14, the vehicle body 500 may include eight brackets 610. As such, the brackets 610 may be positioned proximate the axle assemblies 510. In other embodiments, the vehicle body 500 may include any number of brackets 610.

Instead of utilizing a separate battery frame 540 that extends from the frame structure 510 as described above, the battery module 550 may instead be coupled to an underside of the body 530. In such an example, the battery module 550 may include fasteners (e.g., bolts, brackets, latches, etc.) to couple the battery module 550 to the body 530. As can be appreciated, when the battery module 550 is coupled to the body 530, the battery module 550 may be permitted from moving such to create a rigid structure. In other embodiments, the battery module 550 may include stabilizers to stabilize the battery module 550 when the vehicle is moving. The battery module 550 may extend outward to form sides of the vehicle body 530, where the battery module 550 may be configured as a frame member to absorb stresses introduced to the vehicle body 500. For example, the battery module 550 may be configured to absorb vehicle body stresses 530 to assist in load distribution.

According to an exemplary embodiment, the battery module 550 may be selectively removable from the body 530 by removing the one or more fasteners coupling the battery module 550 to the body 530. In other embodiments, the battery module 550 may include a disconnect system (e.g., fastener, latch, actuator, etc.) configured to remove the battery module 550 from the body 530. As can be appreciated, the battery module 550 may be removed to for service, replacement, or the like.

Figure 18:
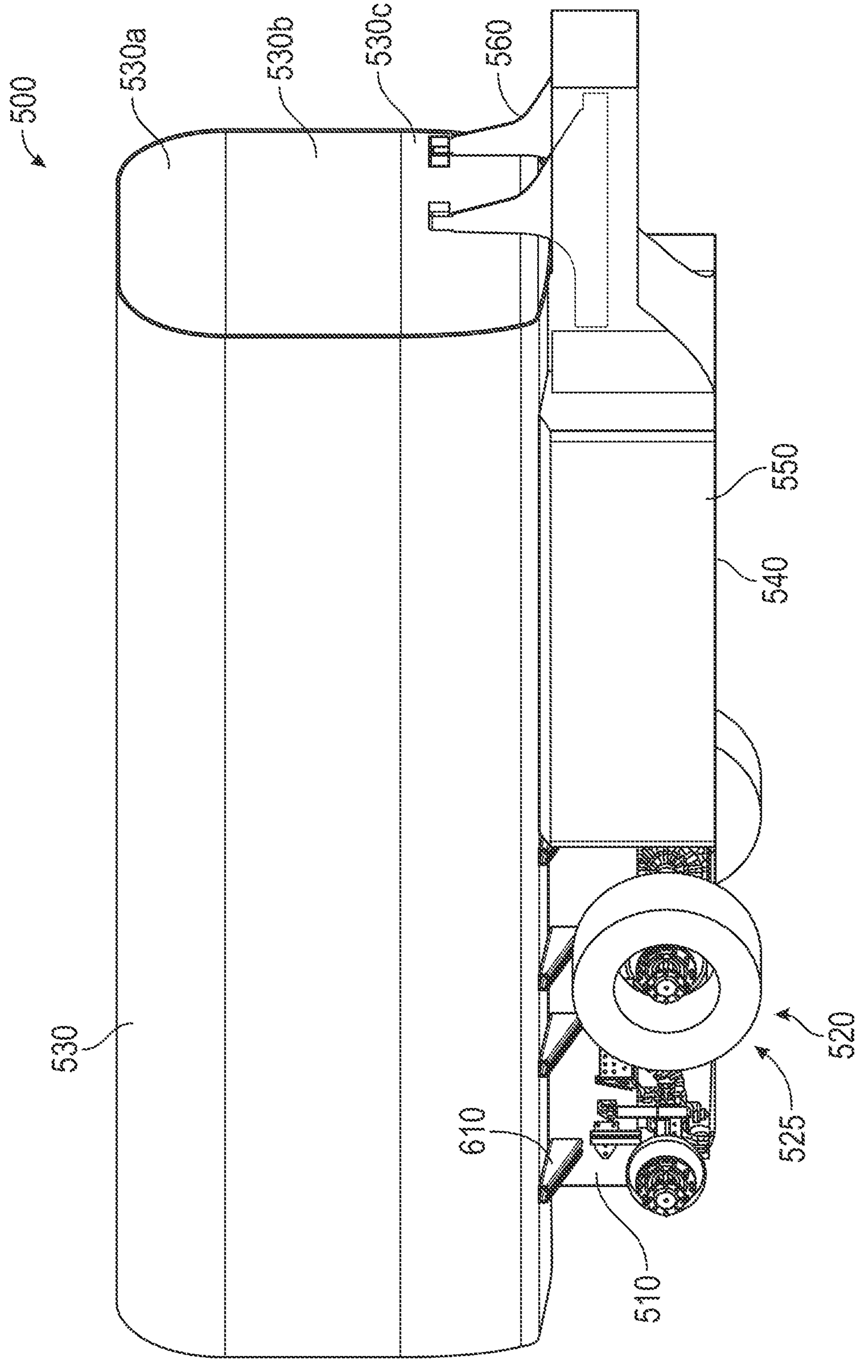
FIG. 18 is a perspective view of a vehicle body for use in the vehicle of FIG. 1, according to an exemplary embodiment.
Figure 19:
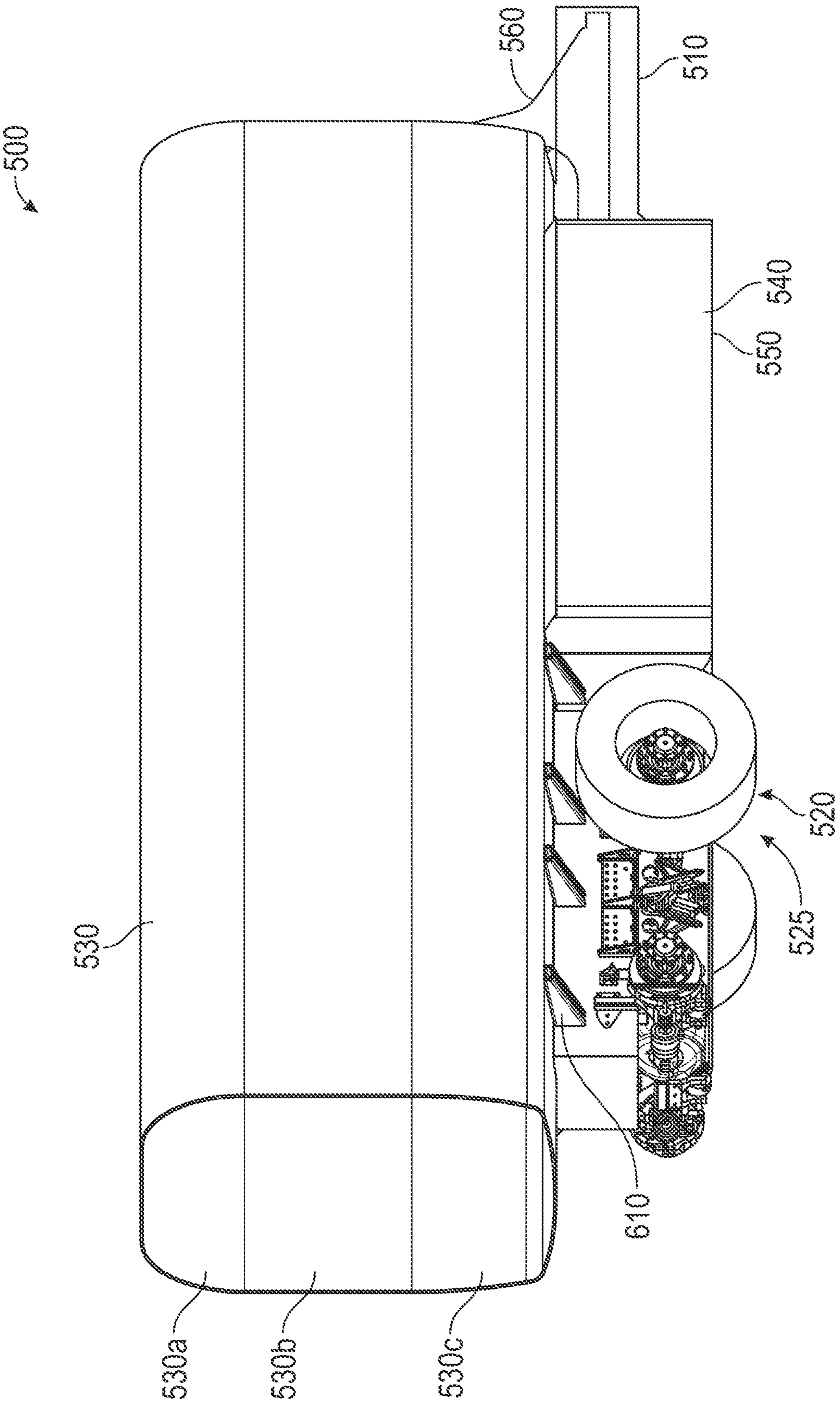
FIG. 19 is another perspective view of the vehicle body of FIG. 18, according to an exemplary embodiment.

Referring specifically to FIGS. 18 and 19, the vehicle body 500 is shown with the axle assemblies 520, the supports 560, and the battery module 550 integrated into the body 530, according to another exemplary embodiment. As shown, the supports 560 may be integrated into the body 530 proximate the battery module 550. In other embodiments, the supports 560 may be integrated into the body 530 between the body 530 and the battery module 550. More specifically, the frame structure 510 may extend past an end of the body 530, where the supports 560 may be coupled to the frame structure 510 and further extend upwards from the frame structure 510.

The body 530 may be coupled to the frame structure 510 via one or more brackets, mounting provisions, or the like, shown as brackets 610. The brackets 610 may extend between the body 530 and the frame structure 510. According to an exemplary embodiment, the brackets 610 may form a right-angle bracket having one side fixedly coupled to the body 530 and another side fixedly coupled to the frame structure 510. In other embodiments, the brackets 610 may be angular brackets that angularly extend between the body 530 and the frame structure 510. The brackets 610 may be further configured to support the body 530 into a position in which the body 530 may not vertically or horizontally move. In other embodiments, the brackets 610 may permit vertical movement of the body 530. As shown in FIG. 14, the vehicle body 500 may include eight brackets 610. As such, the brackets 610 may be positioned proximate the axle assemblies 510. In other embodiments, the vehicle body 500 may include any number of brackets 610.

The battery module 550 in FIGS. 18 and 19 is shown as being integrated in to the frame structure 510. In such an example, the battery module 550 may be integrated into the frame structure 510 before the body 530 is coupled to the frame structure 510, and, as such, the battery module 550 may not be separable from the body 530. By way of example, the frame structure 510 may include one or more cavities therein where the battery module 550 may be positioned. In other embodiments, the frame structure 510 may be molded about the battery module 550. As can be appreciated, the configuration of having the battery module 550 integrated into the frame structure provides the greatest space utilization and packing abilities by forming a unitary body between the body 530, the frame structure 510, and the battery frame 540.

Figure 20:
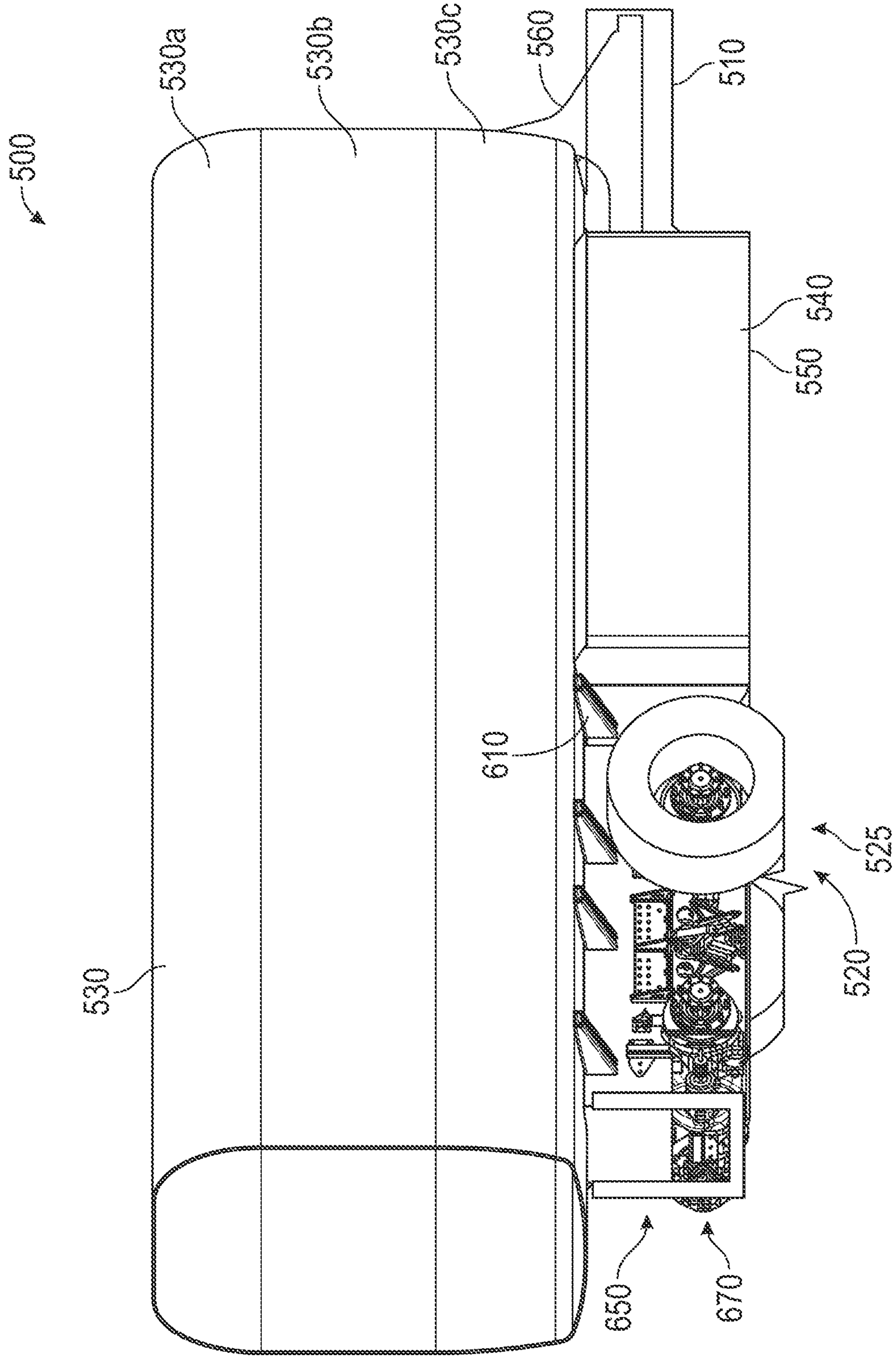
FIG. 20 is a perspective view of a vehicle body for use in the vehicle of FIG. 1, showing a suspension system, according to an exemplary embodiment.
Figure 21:
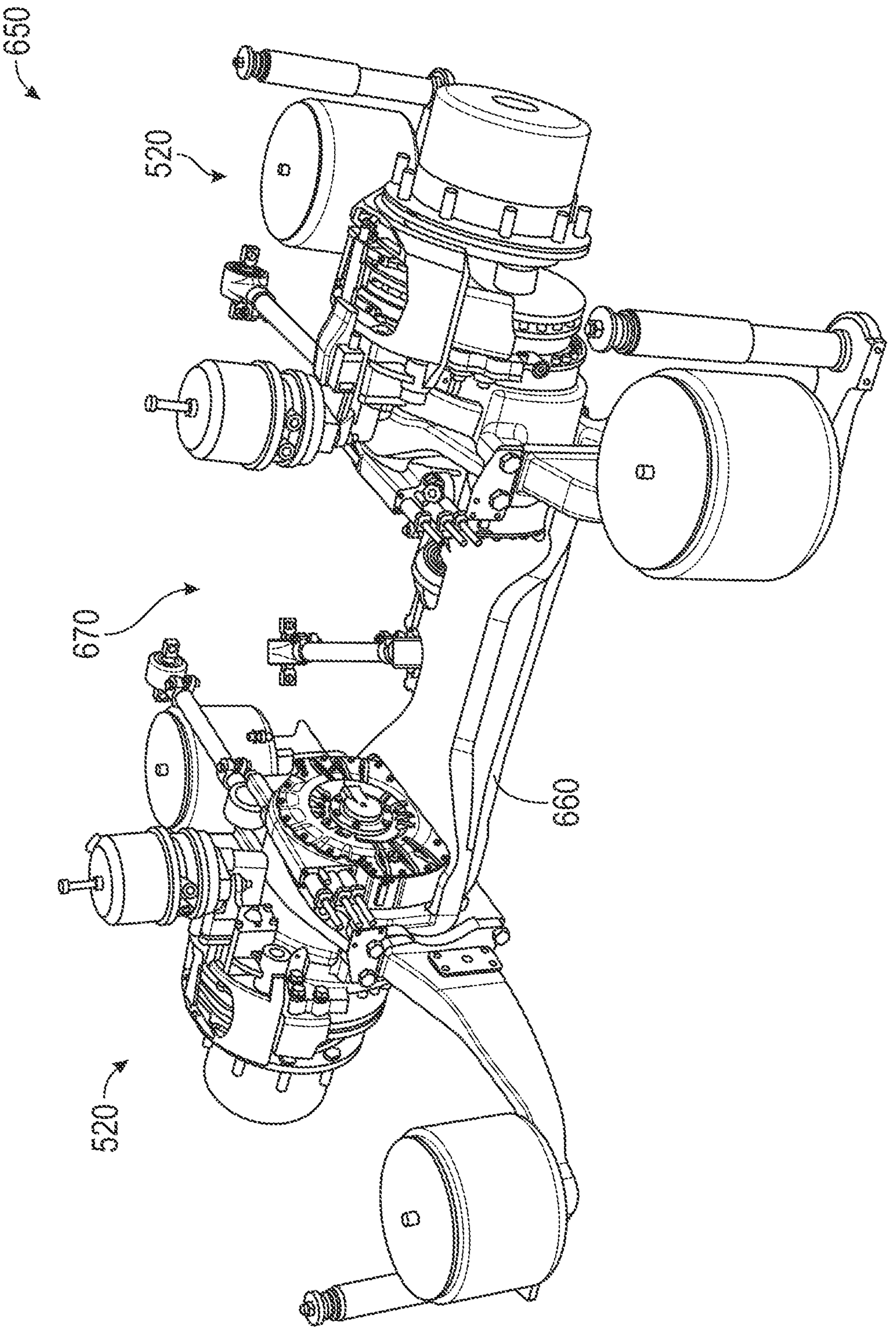
FIG. 21 is a perspective view of the suspension system of FIG. 20, according to an exemplary embodiment.

Referring specifically to FIGS. 20 and 21, a suspension system 650 for the vehicle body 500 is shown. The suspension system 650 may be an electric suspension system. In other embodiments, the suspension system 650 may be a normal suspension system 650 configured for use with internal combustion engine vehicles. In some embodiments, the suspension system 650 may include one or more busbars operably coupled to the battery modules 550, where the suspension system 650 may supply power to the battery modules 550 via suspension regeneration (e.g., vertical travel of the suspension system 650, etc.). The suspension system 650 may be coupled to the axle assembly 520. As shown in FIG. 21, the suspension system 650 may include two axle assemblies 520, where the axle assemblies 520 are coupled to one another via a frame 660. A first axle assembly 520 may be positioned proximate a first side of the suspension system 650, and a second axle assembly 520 may be positioned proximate a second side of the suspension system 650.

As can be appreciated, the frame 660 may extend between the axle assemblies 520 at a bottom location, such to permit a space, shown as center section 670 therein. The center section 670 may be a space between the axle assemblies 520. The center section 670 may define a space substantially similar to the battery frame 540 and/or the battery module 550. In other embodiments, the center section 670 may define a space substantially different to the battery frame and/or battery module 550. As can be appreciated, the battery frame 540 and/or the battery module 550 may be positioned within the center section 670. In other embodiments, the battery frame 540 and/or battery module 550 may selectively reposition in and out of the center section 670 when the suspension system 650 is repositioned between an extended position and a retracted position.

Additionally or alternatively, additional battery modules 550 may be positioned within the center section 670. In such an example, the vehicle body 500 may include an additional battery frame 540 configured to house one or more additional battery modules 550. The additional battery modules 550 may be positioned within the center section 670 for enhanced packability and space utilization.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:

1. A refuse vehicle comprising:

a frame structure;

one or more axle assemblies coupled to the frame structure and extending laterally from the frame structure;

a body coupled to the frame structure and extending along at least a portion of a length of the frame structure, the body comprising an upper section, a middle section, and a lower section;

one or more cab supports extending along the length of the frame structure and configured to receive a cab of the refuse vehicle;

a plurality of brackets fixedly coupled to the frame structure and the body, the plurality of brackets configured to secure the frame structure to the body; and a battery frame coupled to the frame structure, the battery frame configured to house one or more battery modules therein;

wherein the body and the battery frame cooperatively define a unitary body.

2. The refuse vehicle of claim 1, wherein the battery frame extends between a cavity formed between the one or more axle assemblies.

3. The refuse vehicle of claim 1, the one or more axle assemblies comprising a plurality of axle assemblies, and further comprising:

the battery frame disposed at least partially between a first axle assembly of the plurality of axle assemblies and a second axle assembly of the plurality of axle assemblies; and the first axle assembly of the plurality of axle assemblies located proximate to a first side of the frame structure and the second axle assembly of the plurality of axle assemblies located proximate to a second side of the frame structure.

4. The refuse vehicle of claim 3, further comprising:

the first axle assembly of the plurality of axle assemblies coupled with the second axle assembly of the plurality of axle assemblies via a second frame structure disposed at least partially beneath the first axle assembly of the plurality of axle assemblies and the second axle assembly of the plurality of axle assemblies; and the second frame structure establishing a first section to house the battery frame.

5. The refuse vehicle of claim 1, further comprising:

the battery frame configured to carry at least a portion of the refuse vehicle; and the battery frame removably coupled with the frame structure such that the one or more battery modules are selectively removable from the battery frame.

6. The refuse vehicle of claim 1, further comprising:

the battery frame having a first offset from the body substantially similar to a second offset of the one or axle assemblies from the body; and the first offset of the battery frame defining a space between the battery frame and the body.

7. The refuse vehicle of claim 1, further comprising:

the frame structure including a cavity configured to house the one or more battery modules such that the one or more battery modules are disposed at least partially between a first portion of the frame structure and a first portion of the battery frame.

8. The refuse vehicle of claim 1, further comprising:

the battery frame extending outward from a least a portion of the body; and the battery frame configured to define at least one side of the unitary body.

9. The refuse vehicle of claim 1, the one or more axle assemblies comprising a first axle assembly and a second axle assembly, and further comprising:

a suspension system including:

the first axle assembly and the second axle assembly;

a second frame structure coupled to the first axle assembly and the second axle assembly, the second frame structure extending along a bottom portion of the suspension system; and the first axle assembly, the second axle assembly, and the second frame structure configured to cooperatively define a center section of the refuse vehicle, and the one or more battery modules positioned within the center section.

10. The refuse vehicle of claim 1, further comprising:

the one or more battery modules electrically coupled with at least one motor and the one or more battery modules configured to provide power to the motor to move the refuse vehicle.

11. The refuse vehicle of claim 1, further comprising:

the one or more battery modules electrically coupled with the one or more axle assemblies; and the one or more axle assemblies configured to provide power, responsive to a movement of the one or more axle assemblies, to the one or more battery modules.

12. A refuse vehicle comprising:

a frame structure;

a plurality of axle assemblies coupled to the frame structure and extending laterally from the frame structure, a first axle assembly of the plurality of axle assemblies located proximate to a first side of the frame structure, and a second axle assembly of the plurality of axle assemblies located proximate to a second side of the frame structure;

a body coupled to the frame structure and extending along at least a portion of a length of the frame structure, the body comprising an upper section, a middle section, and a lower section;

a plurality of brackets fixedly coupled to the frame structure and the body, the plurality of brackets configured to secure the frame structure to the body;

a battery frame coupled to the frame structure, the battery frame configured to house one or more battery modules therein, and the battery frame disposed at least partially between the first axle assembly of the plurality of axle assemblies and the second axle assembly of the plurality of axle assemblies; and the body and the battery frame configured to cooperatively define a unitary body.

13. The refuse vehicle of claim 12, wherein the battery frame extends between a cavity formed between the first axle assembly of the plurality of axle assemblies and the second axle assembly of the plurality of axle assemblies.

14. The refuse vehicle of claim 12, further comprising:

the first axle assembly of the plurality of axle assemblies coupled with the second axle assembly of the plurality of axle assemblies via a second frame structure disposed at least partially beneath the first axle assembly of the plurality of axle assemblies and the second axle assembly of the plurality of axle assemblies; and the second frame structure establishing a first section to house the battery frame.

15. The refuse vehicle of claim 12, further comprising:

the battery frame configured to carry at least a portion of the refuse vehicle; and the battery frame removably coupled with the frame structure such that the one or more battery modules are selectively removable from the battery frame.

16. The refuse vehicle of claim 12, further comprising:

the battery frame having a first offset from the body substantially similar to a second offset of at least one of the first axle assembly of the plurality of axle assemblies or the second axle assembly of the plurality of axle assemblies; and the first offset of the battery frame defining a space between the battery frame and the body.

17. The refuse vehicle of claim 12, further comprising:

the frame structure including a cavity configured to house the one or more battery modules such that the one or more battery modules are disposed at least partially between a first portion of the frame structure and a first portion of the battery frame.

18. The refuse vehicle of claim 12, further comprising:

the battery frame extending outward from a least a portion of the body; and the battery frame configured to define at least one side of the unitary body.

19. A refuse vehicle comprising:

a frame structure;

a suspension system comprising:

a first axle assembly positioned on a first side of the suspension system;

a second axle assembly positioned on a second side of the suspension system;

a second frame structure coupled to the first axle assembly and the second axle assembly, the second frame extending along a bottom portion of the suspension system; and the first axle assembly, the second axle assembly, and the second frame structure configured to cooperatively define a center section;

a body coupled to the frame structure;

a battery frame coupled to the frame structure, the battery frame configured to house one or more battery modules therein, and at least a portion of the battery frame disposed within the center section; and the body and the battery frame configured to cooperatively define a unitary body.

20. The refuse vehicle of claim 19, further comprising:

the one or more battery modules electrically coupled with at least one motor and the one or more battery modules configured to provide power to the motor to move the refuse vehicle.

* * * * *